United States Patent

[11] 3,573,741

[72] Inventor Bruce D. Gavril
New York, N.Y.
[21] Appl. No. 744,075
[22] Filed July 11, 1968
[45] Patented Apr. 6, 1971
[73] Assignee International Business Machines Corporation
Armonk, N.Y.

[54] CONTROL UNIT FOR INPUT/OUTPUT DEVICES
13 Claims, 21 Drawing Figs.

[52] U.S. Cl. .......... 340/172.5
[51] Int. Cl. .......... G06f 3/00
[50] Field of Search .......... 340/172.5; 235/157

[56] References Cited
UNITED STATES PATENTS

| | | | |
|---|---|---|---|
| 3,283,308 | 11/1966 | Klein et al. .......... | 340/172.5 |
| 3,411,143 | 11/1968 | Beavsoleil et al. .......... | 340/172.5 |
| 3,413,612 | 11/1968 | Brooks et al. .......... | 340/172.5 |

*Primary Examiner*—Raulfe B. Zache
*Attorneys*—Hanifin and Jancin and Roy R. Schlemmer, Jr.

ABSTRACT: A versatile, general purpose control unit is provided for controlling a wide variety of digital computer peripheral devices and systems and for facilitating their attachment to the complex system I/O interface. Programmable digital interfaces and control circuitry are provided in the control unit for affecting a wide variety of external device operations in addition to conventional data read and data write functions. Means are further provided for directly interconnecting two peripheral devices through the control unit without computer system activity during data transfer; this eliminates unnecessary interference with the system memory or with the I/O channel. An additional aspect allows the attached peripheral equipment to change the effective system address of the control unit in order to more effectively utilize control unit facilities.

INVENTOR
BRUCE D. GAVRIL

BY [signature]
ATTORNEY

PATENTED APR 6 1971 3,573,741

SHEET 15 OF 16

PDI READ SEQUENCE

PDI WRITE SEQUENCE

CONTROL UNIT FOR INPUT/OUTPUT DEVICES

BACKGROUND OF THE INVENTION

Most I/O equipment of standard computer systems sold by a given manufacturer normally consists of modular units adapted for ready attachment to the central processing unit. These vary from the simplest, most straightforward I/O devices, such as tapes, discs, drums, etc. to sophisticated auxiliary central processing units. To a typical user, whose needs are ordinarily satisfied by a manufacturer's standard product line, the complexities involved in the interconnection and operation of various nonstandard Input/Output components are often an inconvenience, for he is primarily interested in the overall result produced by the system as purchased.

However, to the designer of custom systems who wishes to use only the basic system of a given manufacturer, the situation is entirely different. A typical requirement is to attach and operate a great variety of special peripheral devices, and to do this it is necessary to get at the viscera of the hardware. Such equipment must attach directly to the various system data and command busses and require a detailed knowledge of all polarities, signal levels, signal central sequences, characteristic impedences detailed timing information, etc.

Up to the present time the basic points of attachment of peripheral equipment have been extremely limited. Many systems have a standard I/O interface and/or various adaptive units. The standard I/O interfaces are extremely complex (for the reasons stated above) and the latter ordinarily have very limited operational capabilities.

The present control unit is designed to bridge this interconnection gap and to deliver the full capability of the input/output channel of the central processor in a much more useable form. The present control unit makes a central computer system more attractive to those who wish to attach devices made by someone other than the manufacture of the basic system. These devices include digital processors, analog-to-digital converters, digital-to-analog converters, tape drives, plotters, displays, communication equipment, and a host of other devices or systems.

SUMMARY AND OBJECTS OF THE INVENTION

It has now been found that an extremely versatile control unit may be connected to the standard interface of the channels of a standard computing system. This control unit in turn facilitates the attachment of a wide variety of peripheral devices by means of relatively simple control unit-to-device adapters. The control unit greatly reduces the complexity of actual attachment by providing once-and-for-all the logic and control necessary for communicating with the complex channel. Included are device address assignment facilities for each transmission channel of the control unit. Control is also provided for allowing the I/O Interface address of the control unit to be altered externally. This feature allows the external hardware itself to modify the channel address of the control unit to which it is attached.

The unit further provides means for decoding control and sense commands as well as conventional read and write commands. The former are passed on to the attached peripheral devices for a wide variety of applications. This facility is one aspect of the programmable feature of the interface of the control unit. Another feature of the programmable interface includes a variety of selectable control and tag lines.

Finally, facilities are provided for directly connecting two peripheral devices operating with different transmission channels of the control unit. This allows the two peripheral units to communicate directly with each other without disturbing the central computing system memory as in the case of most conventional systems. This avoids one device placing its information in memory followed by the second device picking up this information and thus taking up both memory and channel interface buss time needlessly.

It is accordingly a primary object of the present invention to provide a very versatile programmable control unit which facilitates the interconnection of a wide variety of peripheral devices to a standard computing system interface.

It is a further object of the invention to provide such a control unit which may connect two peripheral devices directly together, but under central processor program control.

It is a still further object of the invention to provide such a control unit capable of providing programmed orders or control logic to peripheral units, said orders or control being conveyed to the control unit from the central processing system over standard interface busses.

It is yet another object of the invention to provide such a control unit wherein its address may be changed either under central processing unit control, by the peripheral device itself, or by other external means.

The foregoing and other objects, features and advantages of the invention will be apparent from the following more particular description of a preferred embodiment of the invention, as illustrated in the accompanying drawings.

The objects of the present invention are accomplished in general by a control unit which attaches to the standard interface of a computing system. This computing system includes a central processing unit, a memory shared by the I/O channels and the CPU, an instruction unit, and channels providing an interface for connecting external equipment to the central computing system. This latter interface includes means for transmitting commands and data to devices connected to said interface.

The control unit includes means for receiving data and commands from said central processing system and means for recognizing that a message on the interface is directed to it. Additional means are provided for decoding orders from said central processing unit for specified peripheral devices which are connected to said control unit. Further means are provided for transmitting orders to a specified peripheral device and for setting up data paths between said peripheral device and the central processor. Finally, means are provided for signalling to the central processor that a requested task has been completed by the peripheral unit.

As a preferred embodiment of the invention, each control unit includes at least one transmission section to which a plurality of said peripheral devices may be attached and selectively addressed via the control unit. Means are included in said control unit, operable in response to a command from the central processor, to directly connect a peripheral device connected to one transmission channel of the control unit to a peripheral device connected to another transmission channel of that control unit, thus setting up direct communication between said two peripheral devices.

DRAWINGS

Figures 4, 4A:
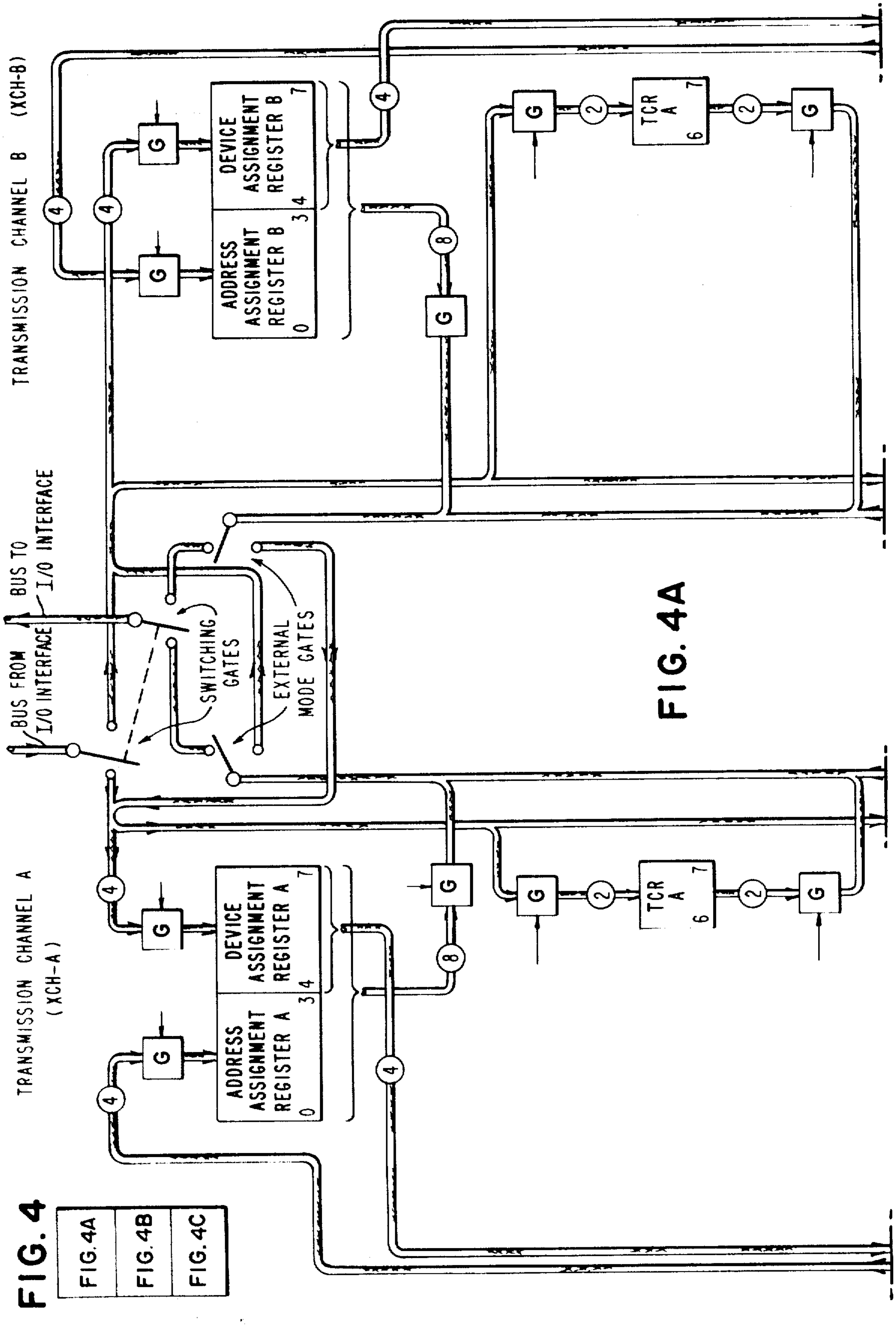
FIG. 4 is an organization diagram for FIGS. 4A—4C.
Figure 4B:
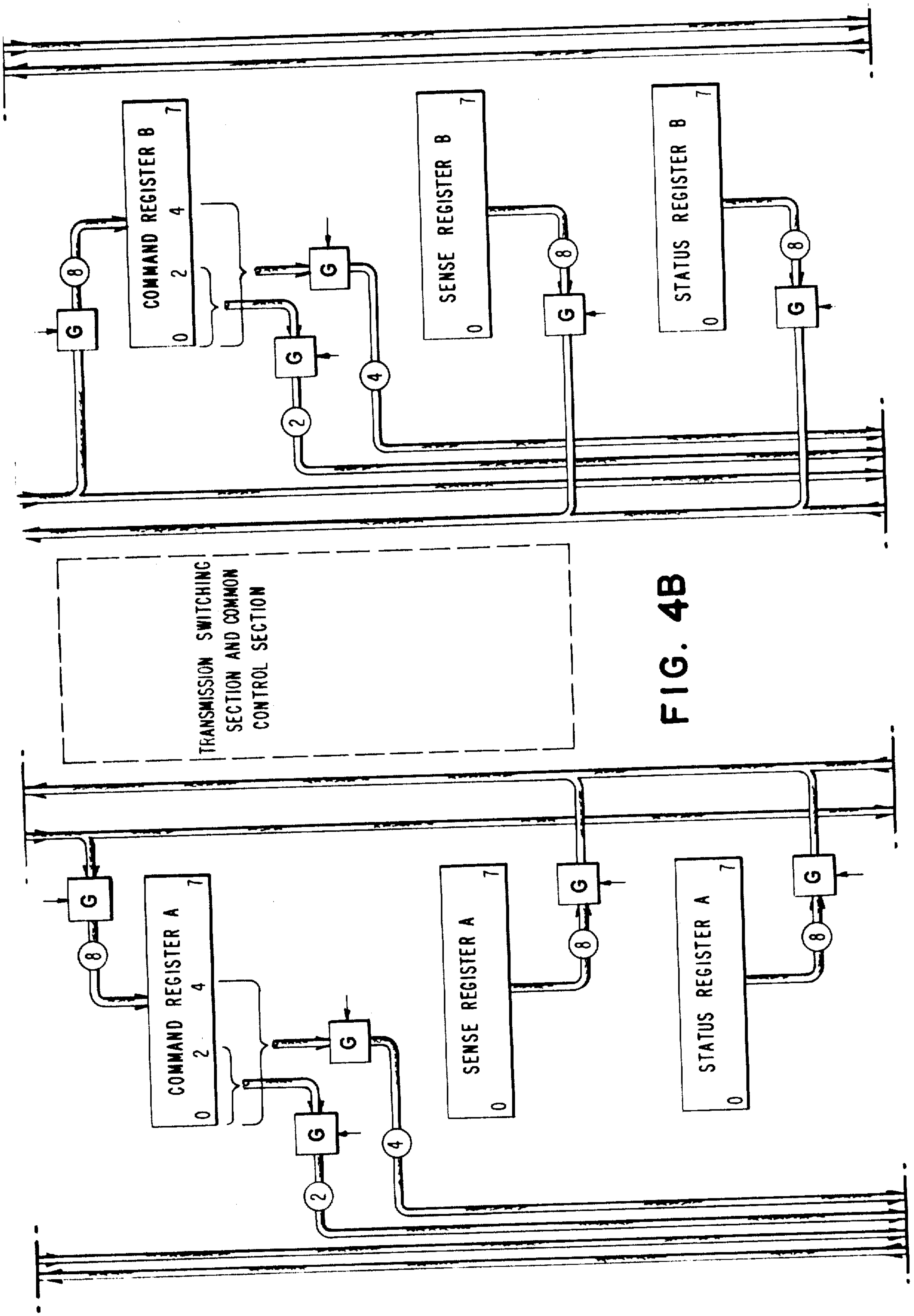
Figure 4C:
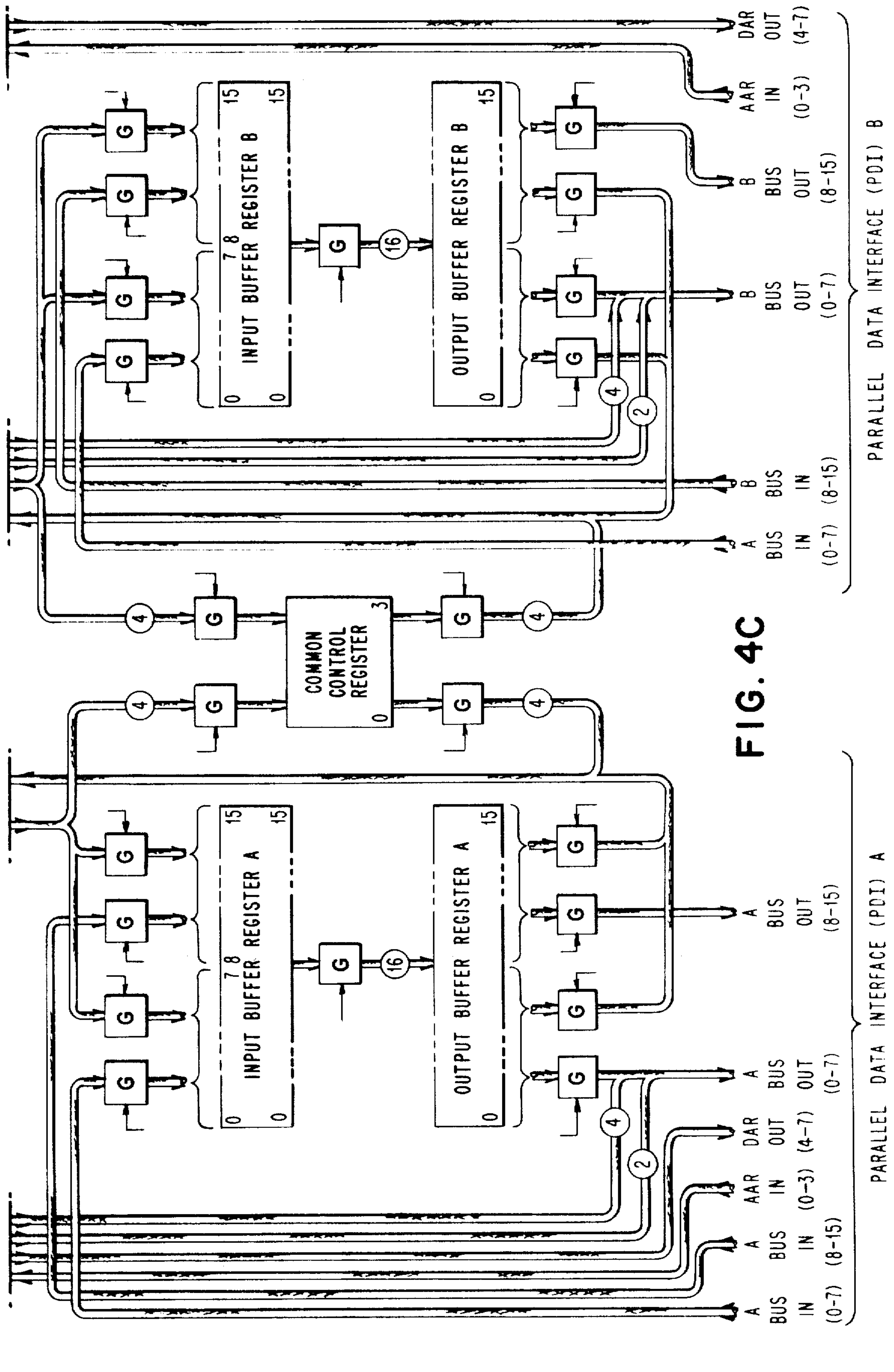

FIG. 4A—4C comprise a functional block diagram of the data registers within one of the special control units of the present invention having two separate subchannels or transmission channels (XCH).

Figure 5:
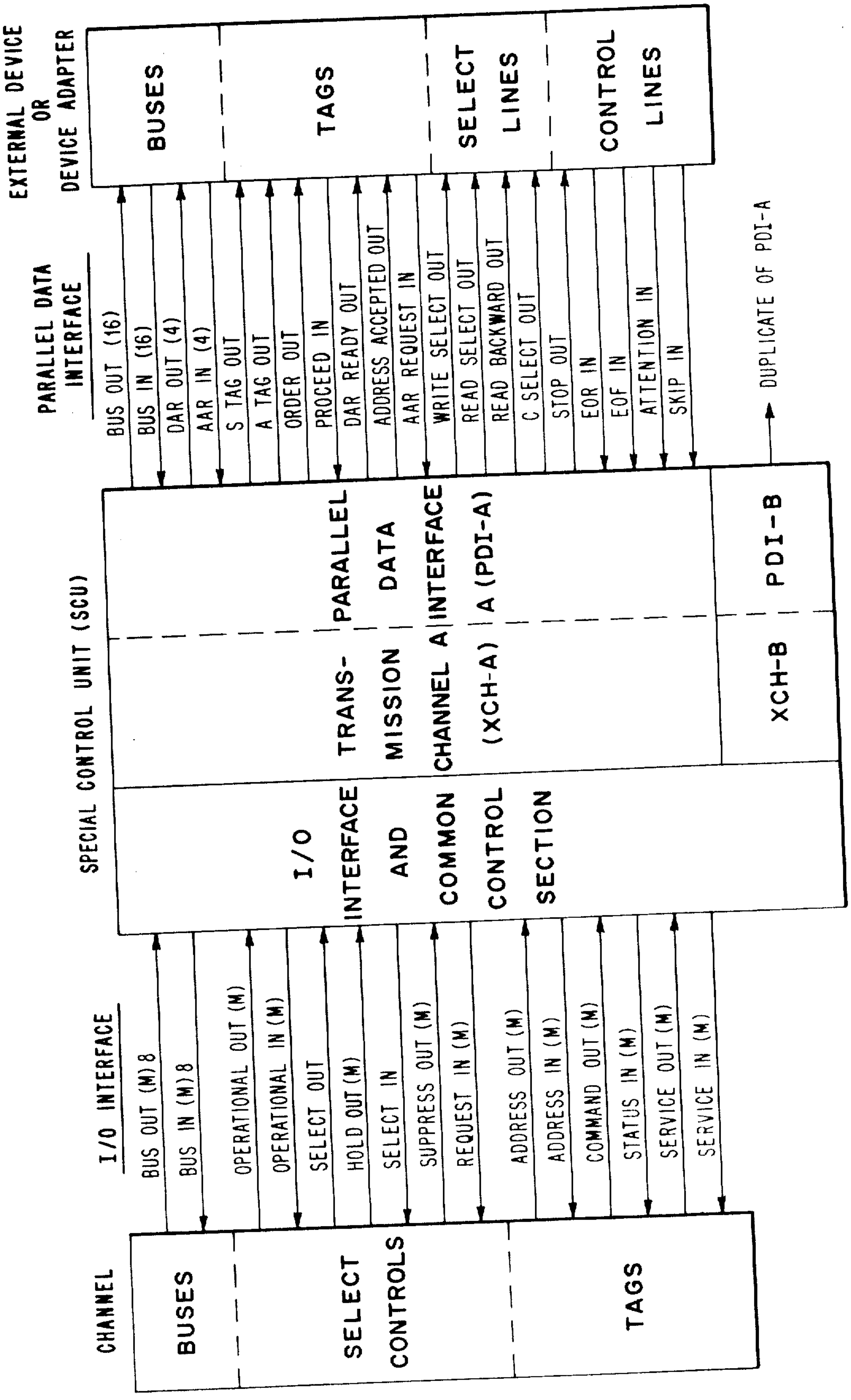

FIG. 5 is a diagrammatic representation illustrating the commands which normally pass between the central processing unit channel section, the special control unit of the present invention and the parallel data interface connecting the special control unit to the various peripheral devices attached thereto.

Figures 6, 6A:
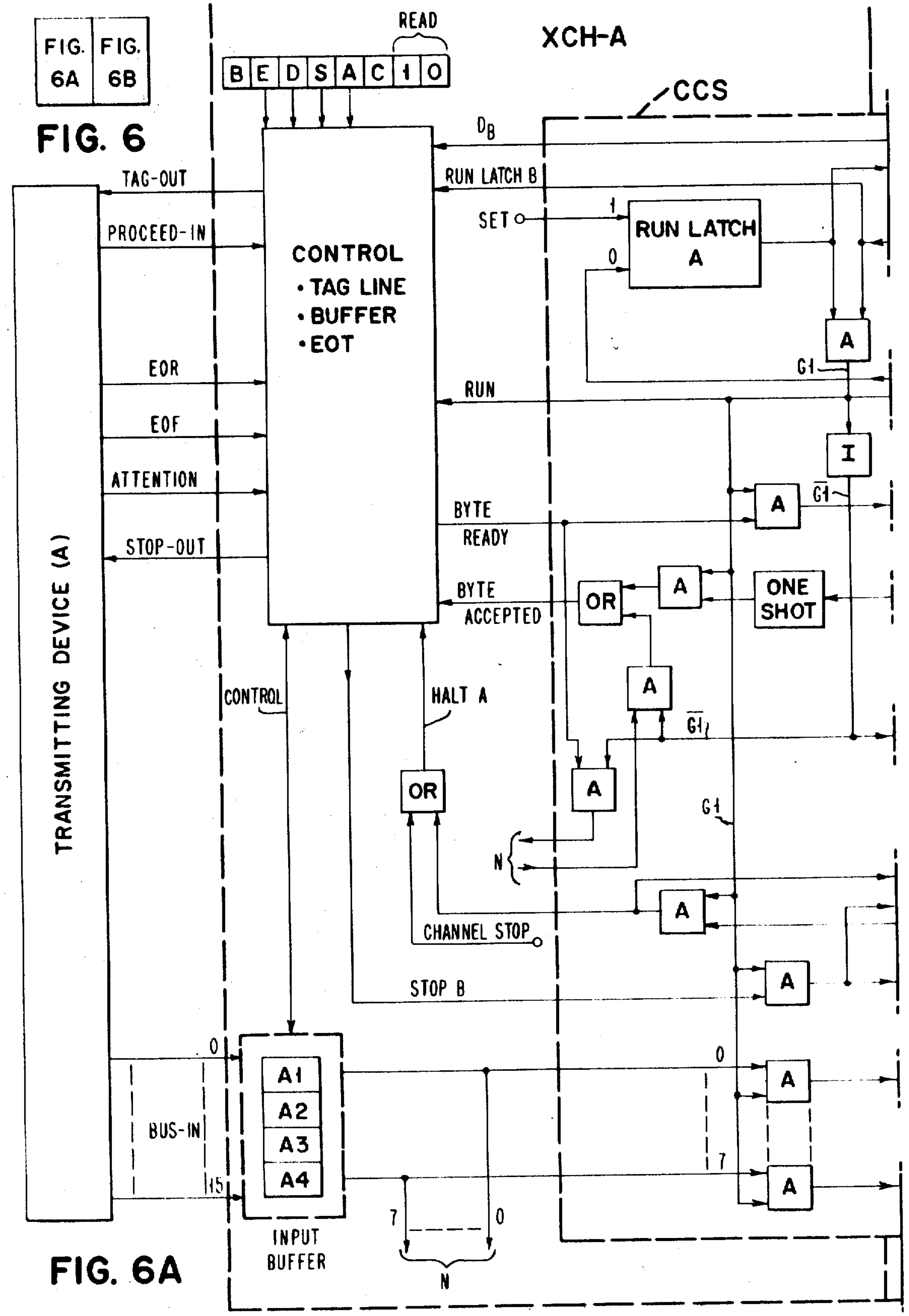
Figure 6B:
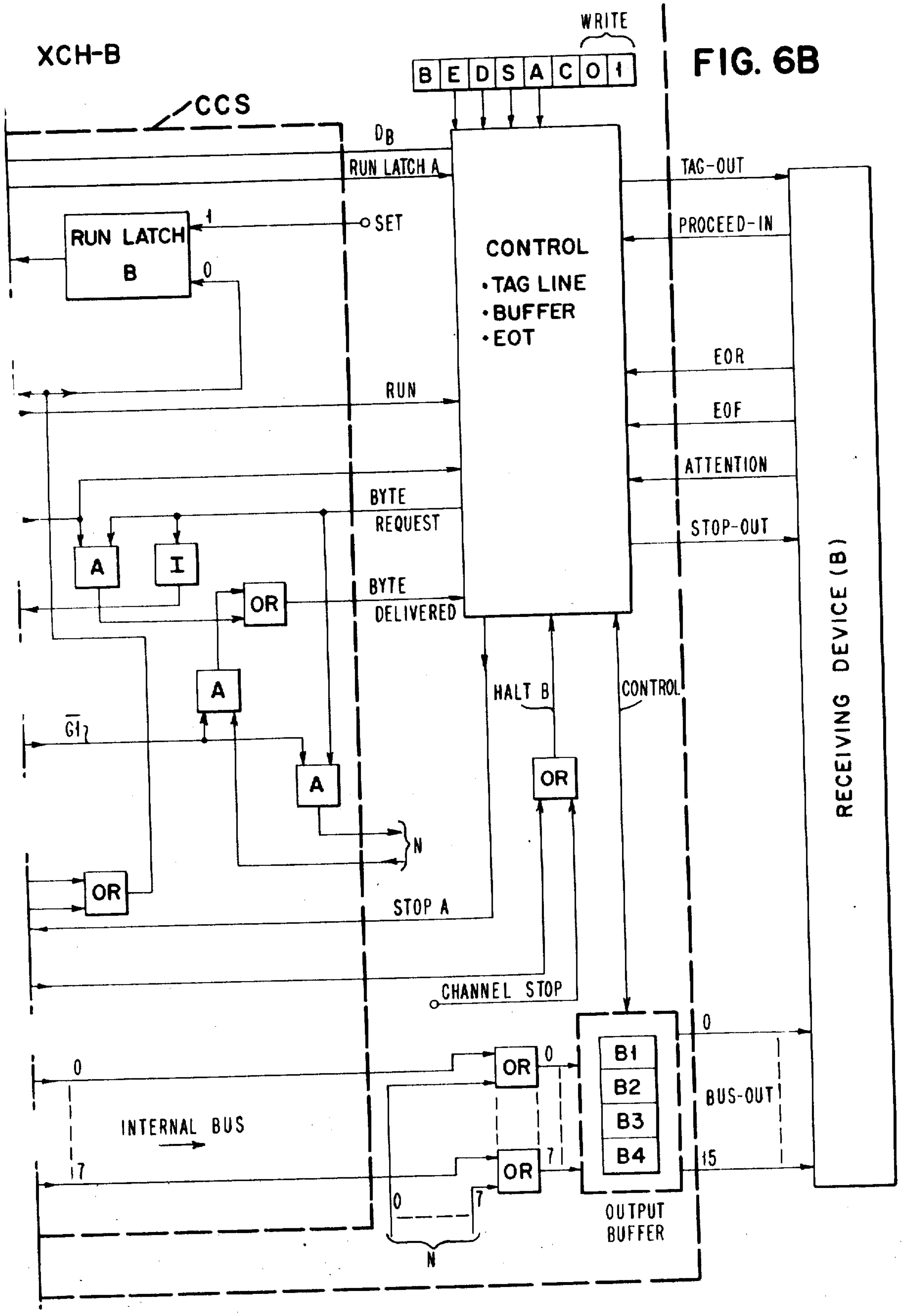

FIGS. 6A and 6B illustrate the SCU functional organization, data flow, and control for direct data transfer from transmitting device A to receiving device B.

Figure 7:
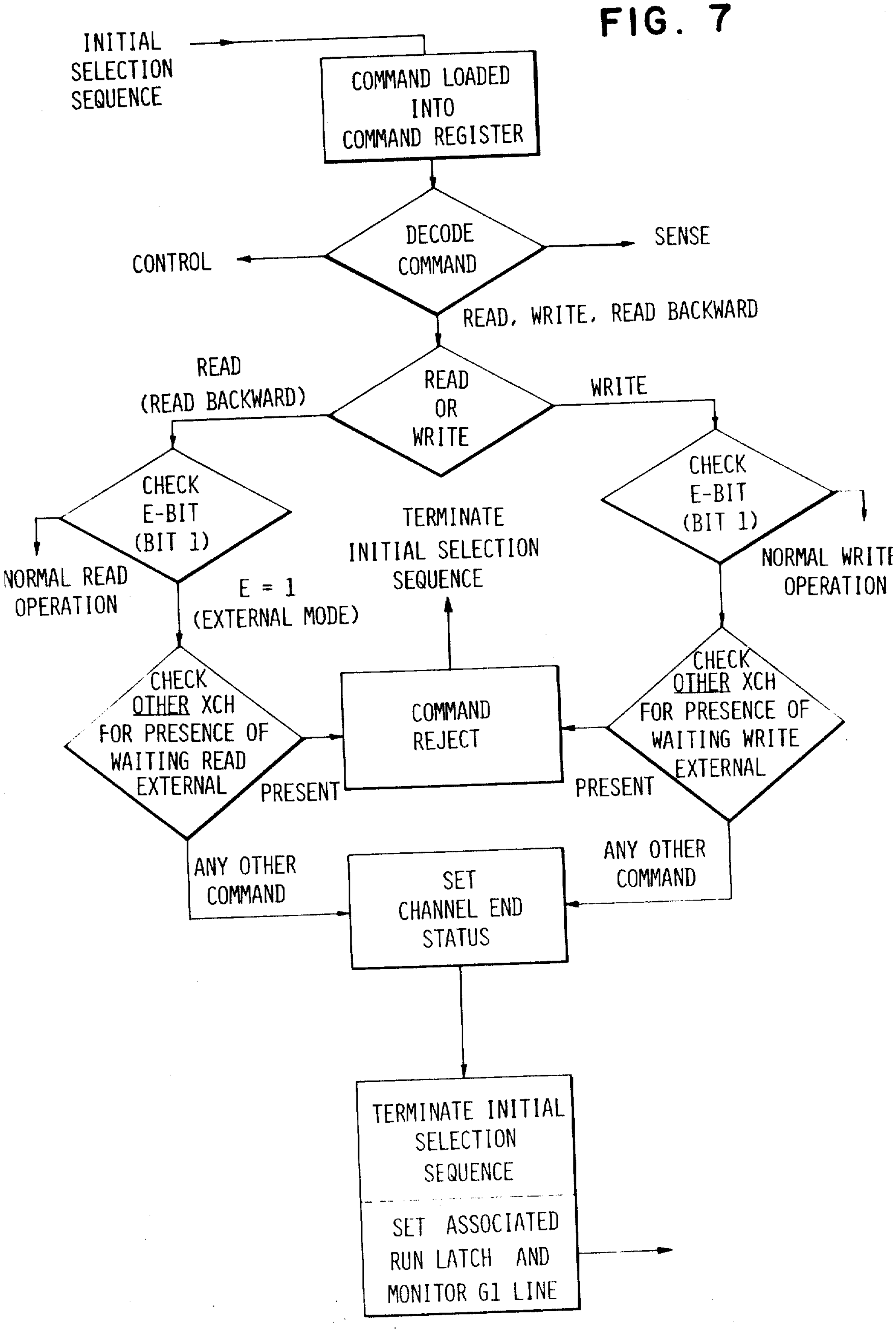

FIG. 7 is a simplified flow chart illustrating operation of External Mode commands during the initial selection sequence.

Figures 8, 8A:
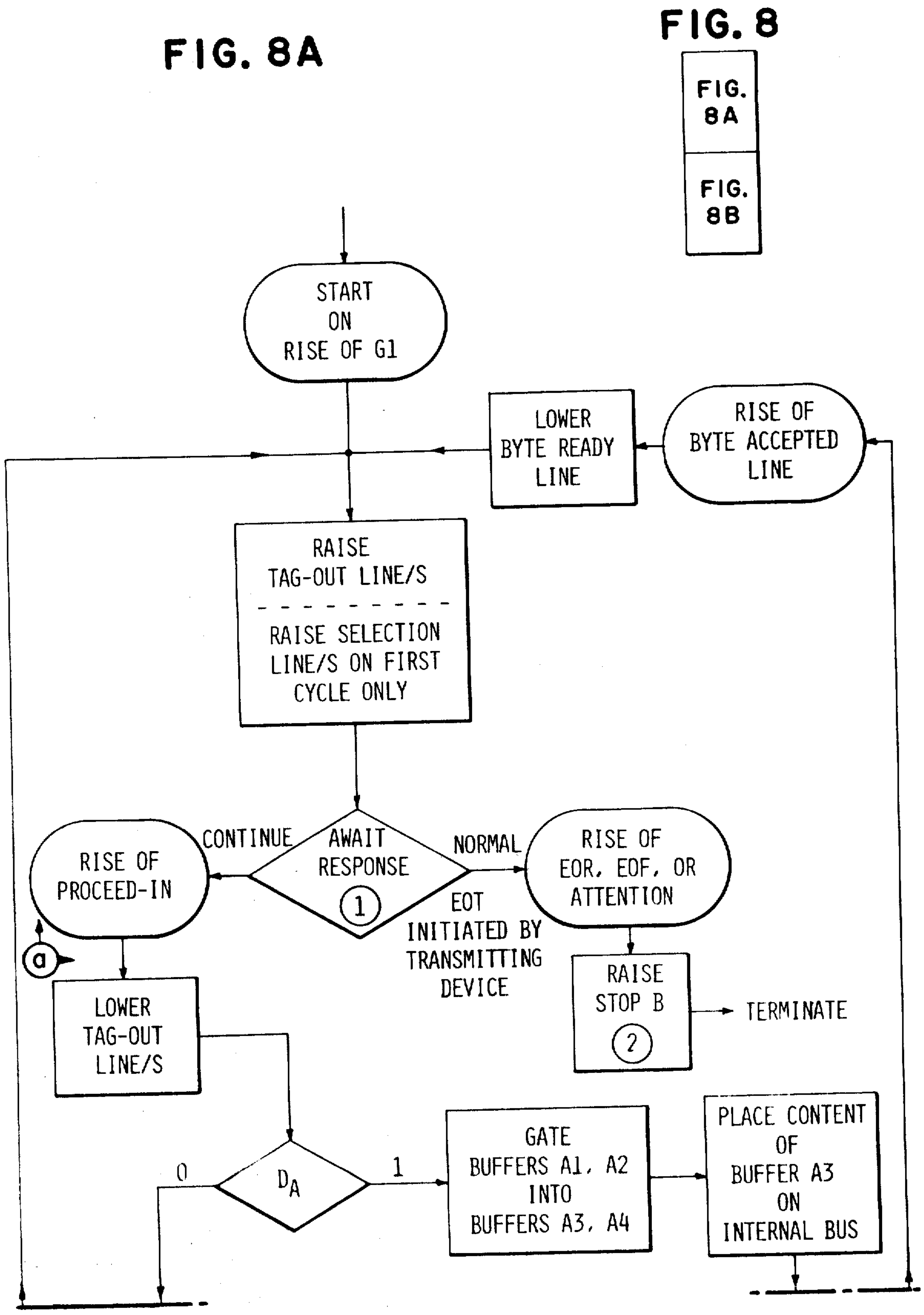
Figure 8B:
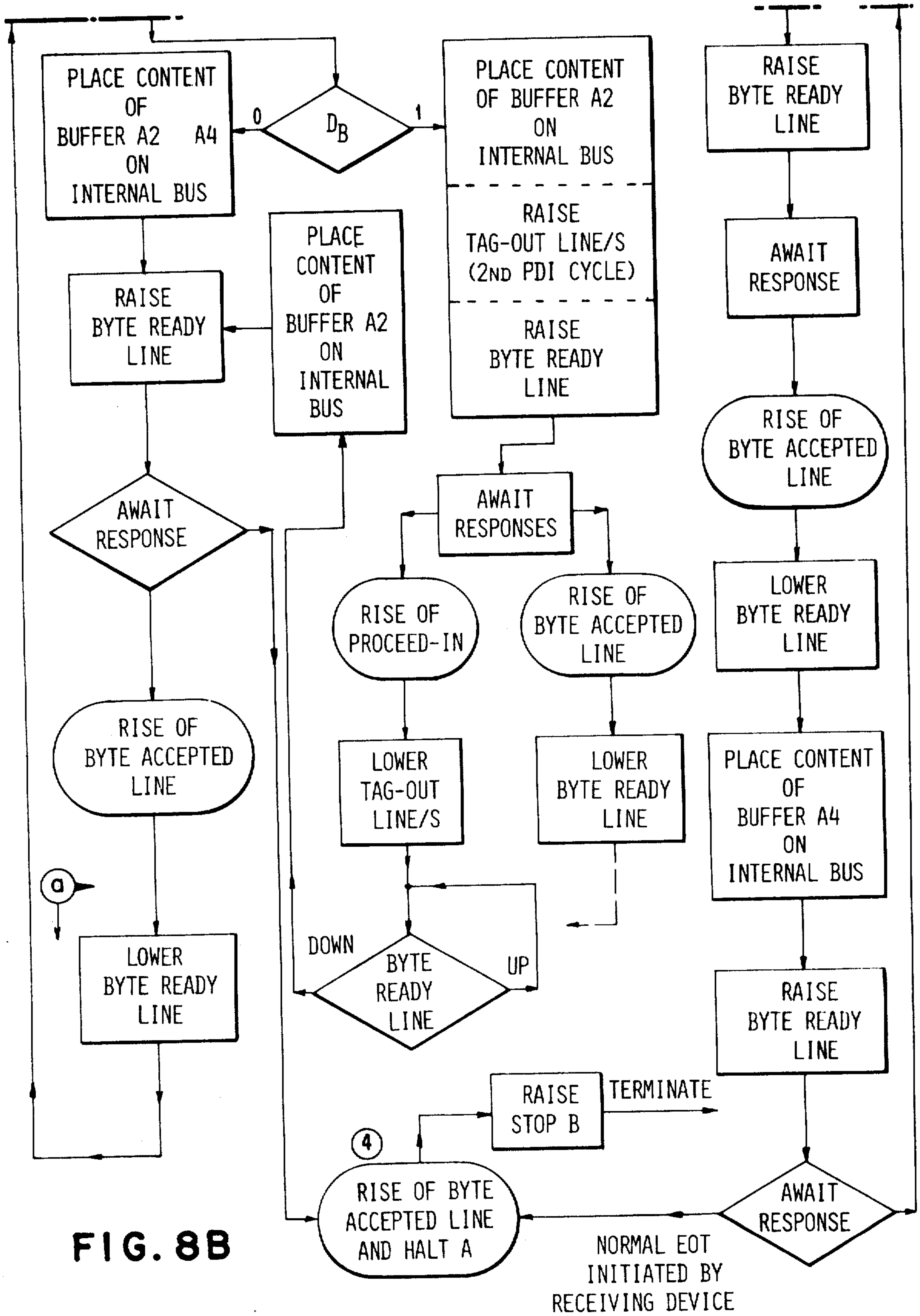

FIGS. 8A and 8B comprise a simplified flow chart illustrating XCH A operation with a Read External command.

Figures 9, 9A:
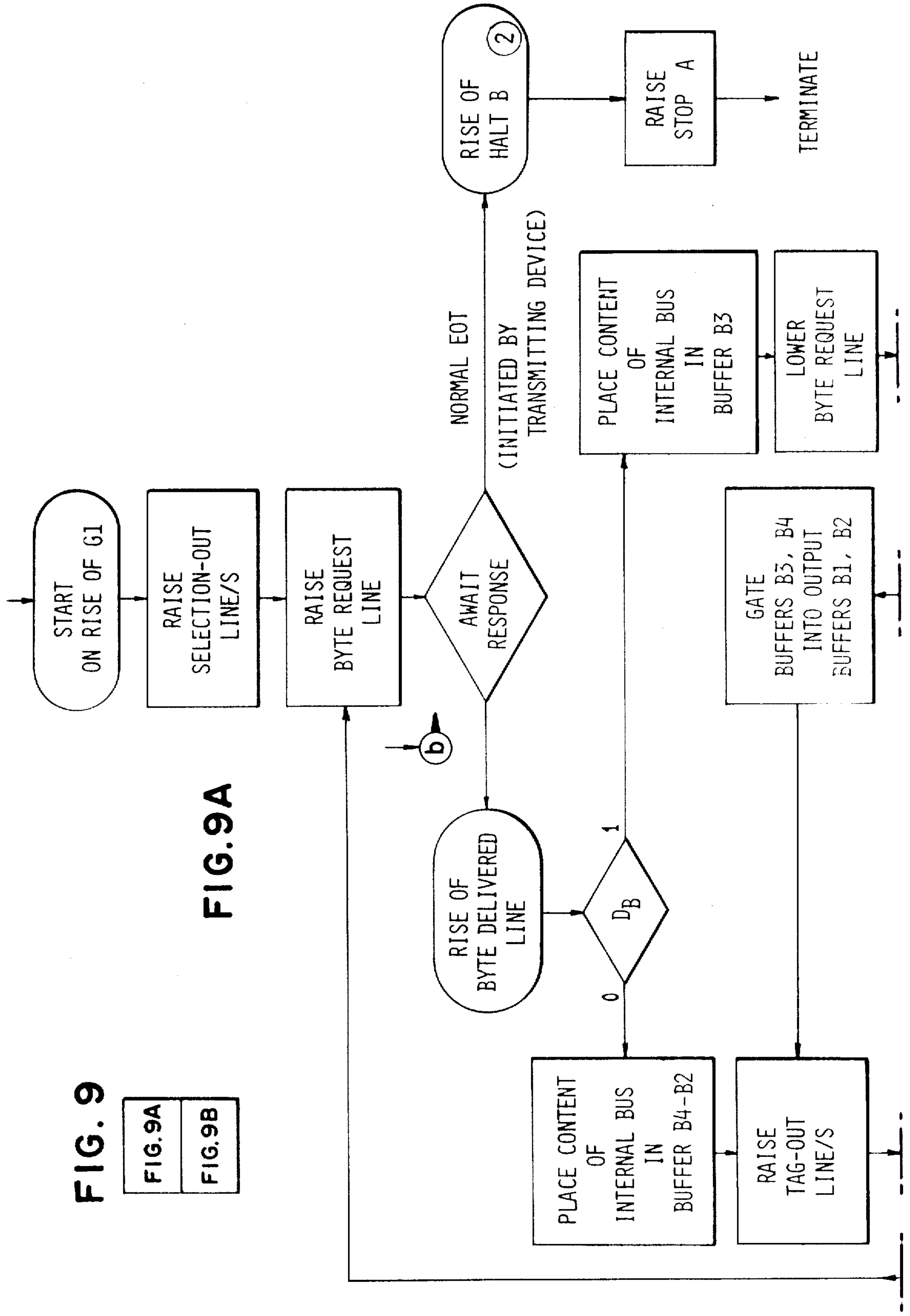
Figure 9B:
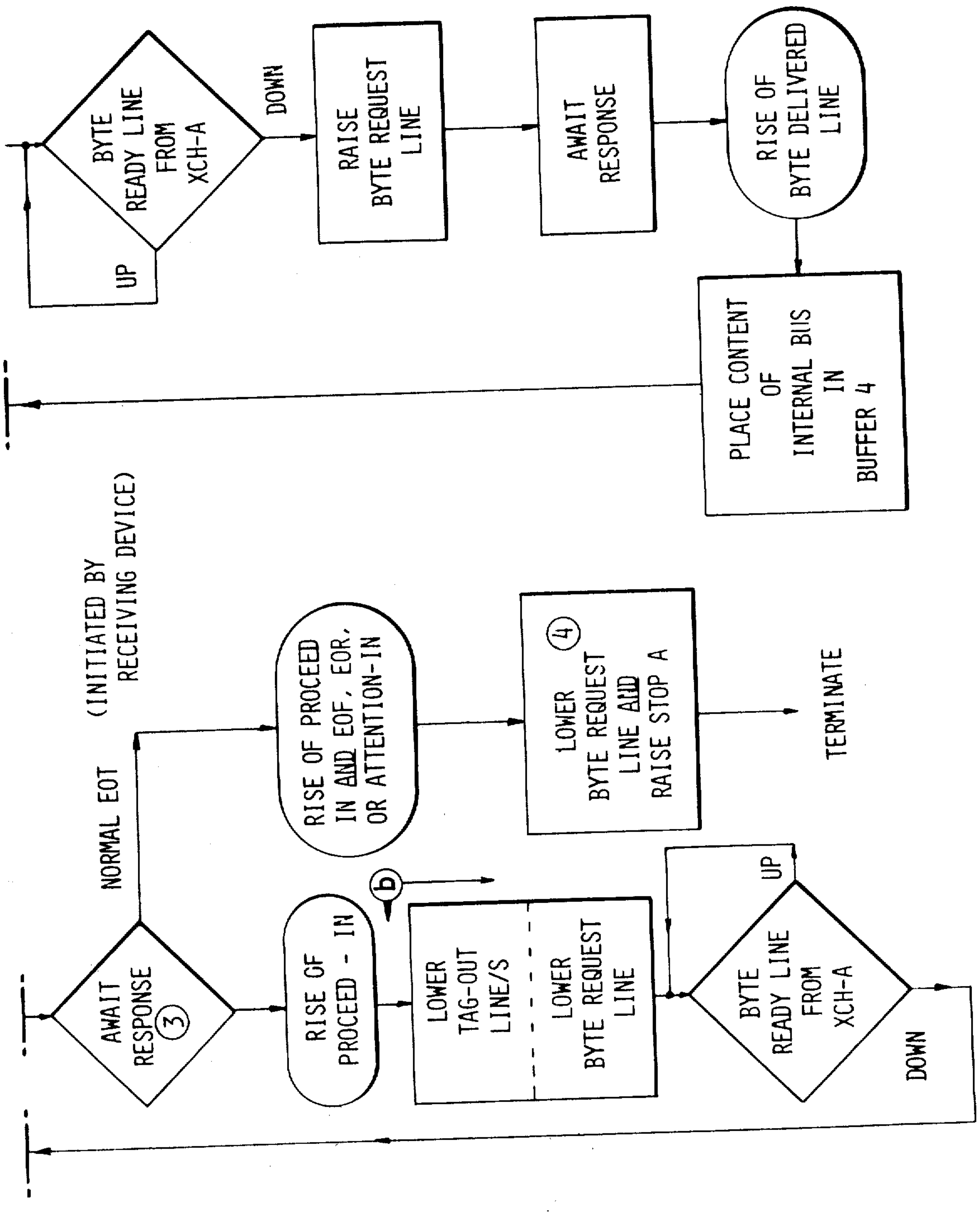

FIGS. 9, 9A and 9B comprise a simplified flow chart illustrating XCH B operation with a Write External command.

Figure 10:
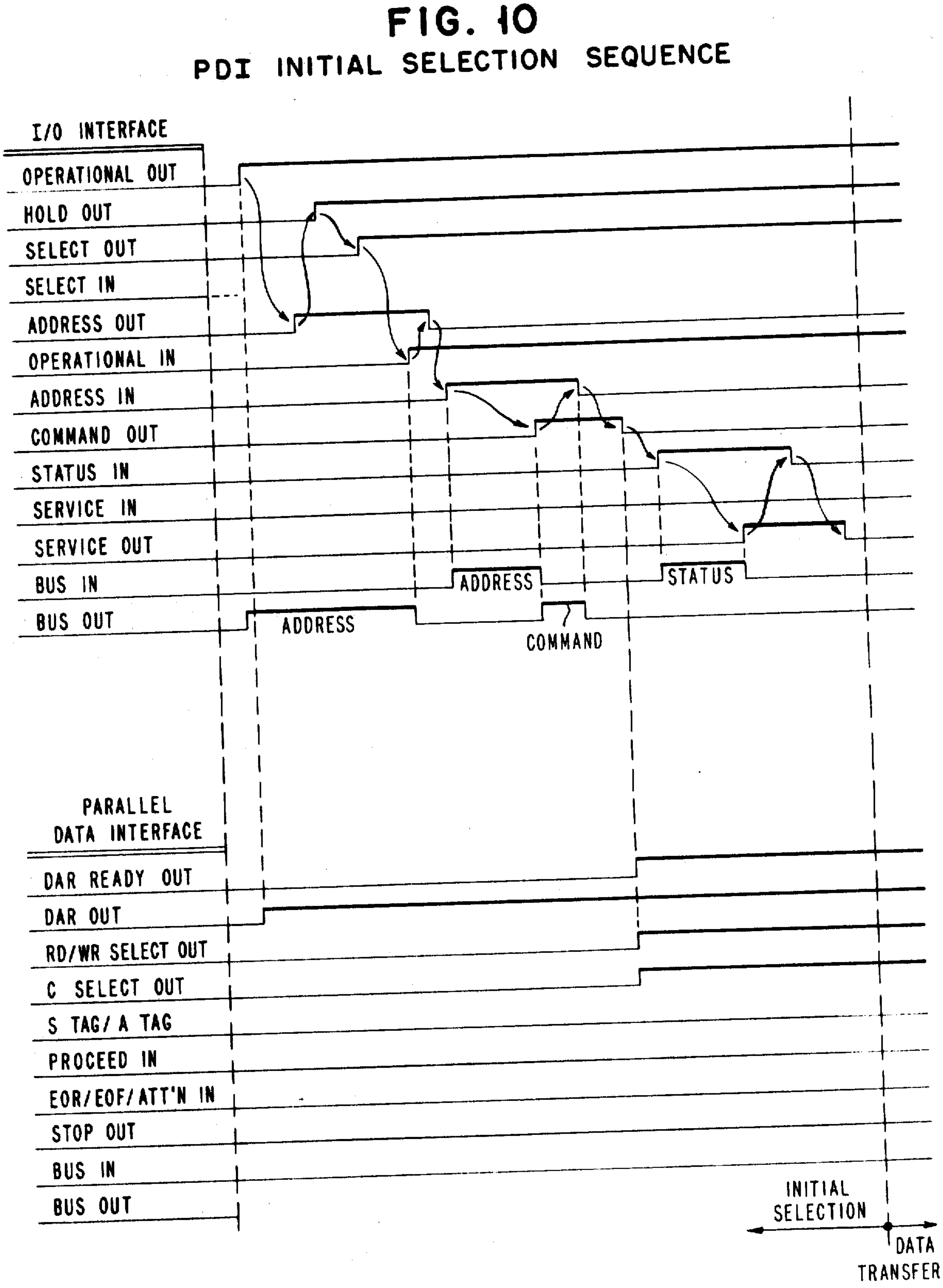

FIG. 10 is a timing chart illustrating the relative timing signals and their sequence which appear on the various control lines, the input to output from the present control unit.

Figure 11:
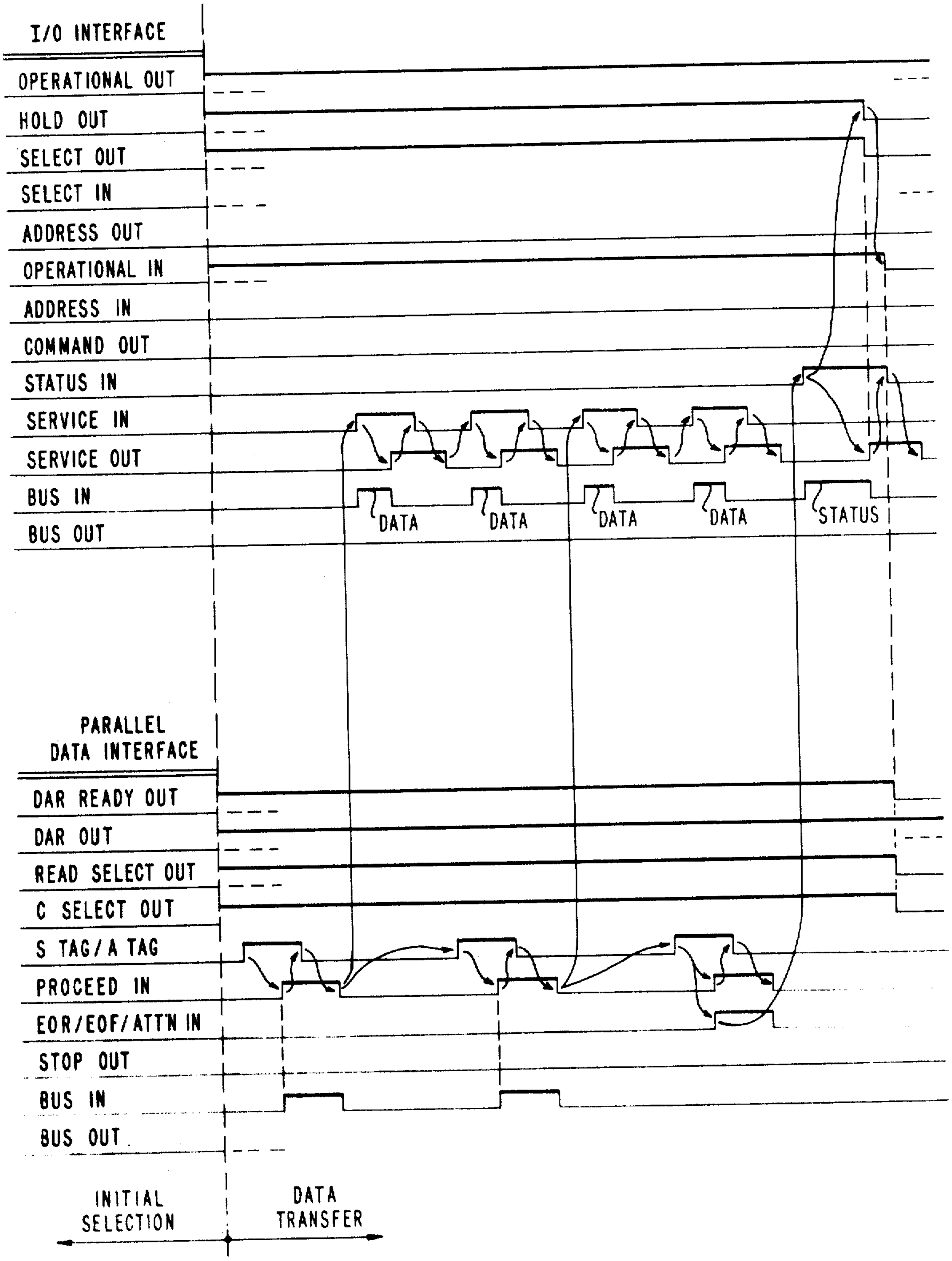

FIG. 11 is a timing chart illustrating the various control pulses appearing on the input and output lines of the present control unit during a PDI read sequence.

Figure 12:
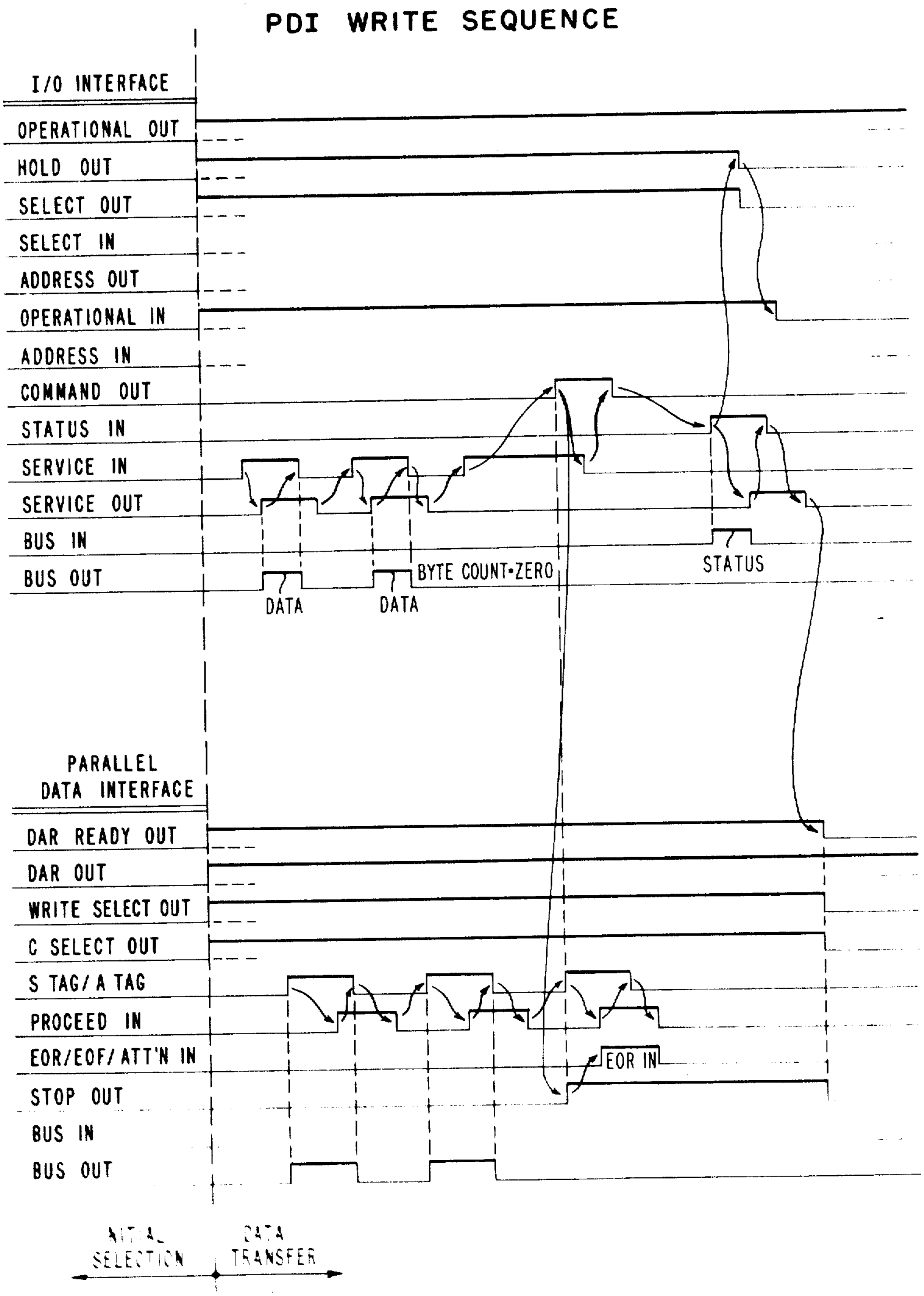

FIG. 12 is a timing sequence chart illustrating the relative timing pulses appearing on the input and output lines of the present special control unit during a PDI write sequence.

DESCRIPTION OF THE DISCLOSED EMBODIMENT

Before proceeding with a description of the present control unit, it should be noted that the concepts included herein are considered to be general and apply to any overall computer processing system having a central storage, a central processing unit and an I/O channel providing an interface to which peripheral equipment, suitably modified, may be attached. However, it should be understood that the presently disclosed embodiment of the present control unit is designed for attachment to the I/O channels of IBM System/360 computers. Thus, the following embodiment refers primarily to IBM System/360. However, as stated previously, it will be understood that the broad concepts of the invention, as set forth in the objects and claims, would be equally adaptable to any manufacturer's standard computing system having the above features. Where appropriate, reference will be made to existing IBM publications, readily available to the public, setting forth the precise circuit and timing details for the standard I/O Interface to which the present control unit may be attached. To include such details in the present disclosure would do little but obfuscate the present invention and accordingly they have been deleted and will generally be referred to functionally as the occasion requires.

Proceeding now with the description of the present control unit (designated SCU throughout the remainder of the specification), it should be noted that the control unit is a high-performance universal control unit designed for an architecturally uniform I/O interface presented by selector and multiplexor channels of System/360, models 30, 40, 44, 50, 65, 67, and 75. The purpose of the unit, as stated previously, is to facilitate the attachment and operation with the central computing system of a wide variety of I/O devices. Normally such devices are very difficult to attach to the system interface and conventional attachments provide only rudimentary control.

The SCU eliminates the need to repeatedly design to the exacting and complicated requirements of the system interface each time a new device is considered for attachment to the system. The SCU, through its two, simple, parallel data interfaces, acts as an intelligent intermediary between attached devices and the system channel. It provides the comprehensive logic required for communication with the channel while at the same time bringing out to the device the full capability of channel architecture. The unique design of the SCU also enhances channel and CPU performance by allowing attached devices to communicate with one another without disturbing either memory or the I/O interface. Its command repertoire includes 121 distinct commands.

Figure 1:
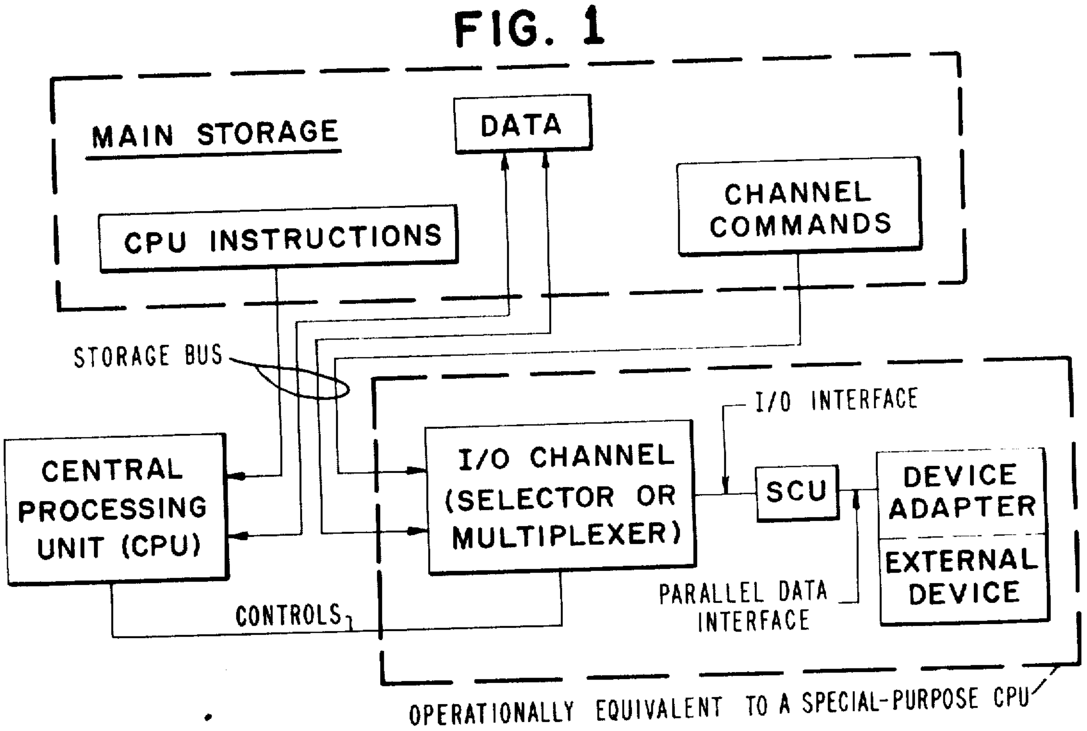
FIG. 1 is a functional block diagram illustrating the organization and interconnection of the Special Control Unit (SCU) with a central processing unit, a main storage, and a specific I/O channel having a I/O interface.

The SCU is intimately associated with the architecture of the channel to which it is connected. A channel is essentially a rudimentary special-purpose processor which shares main memory with the CPU (see FIG. 1). Its function is highly specialized, namely to control the flow of information between I/O devices and main storage. It is directed by its own stored program constructed from a limited channel command repertoire.

As stated previously, the channels communicate with the various I/O devices over an interface called the I/O interface. Over this interface flows the complex exchange of signal sequences which controls the flow of information to and from the attached devices. However, without attached equipment to receive and respond to control signals over the interface, the operation of a channel is completely vitiated.

The SCU attaches directly to the I/O interface and effectively completes the channel architecture by providing all the highly specialized logic necessary for communication over the I/O interface in the "language" of the system channel to which it is attached. I/O devices may in turn be connected to a relatively simple Parallel Data Interface (PDI) of the SCU, rather than directly to the I/O interface. This is illustrated in both FIGS. 1 and 2 (in which latter FIG. the I/O interface and the PDI's are indicated). When an I/O device is attached in this manner, it sees only a straightforward and effectively dedicated demand/response interface of the SCU instead of the complex shared lines of the I/O interface emanating from the channel. The device may now communicate with the system channel through the SCU in a manner relatively independent of the I/O interface and its complexities. Such an arrangement, therefore, avoids the need to repeatedly design to the proprietary complexity of the particular computer system interface, and the attachment of arbitrary devices can be accomplished with relative ease and at a much lower cost.

In the disclosed embodiment, the SCU conforms in every respect to the specifications of the IBM System/360 I/O interface. The details of this interface are described in IBM System Reference Library Manual A22-6843 available to the general public through most Data Processing Division outlets. As stated previously, the details of the specific System/360 interface complex do not materially add to the description of the present invention.

Figure 2:
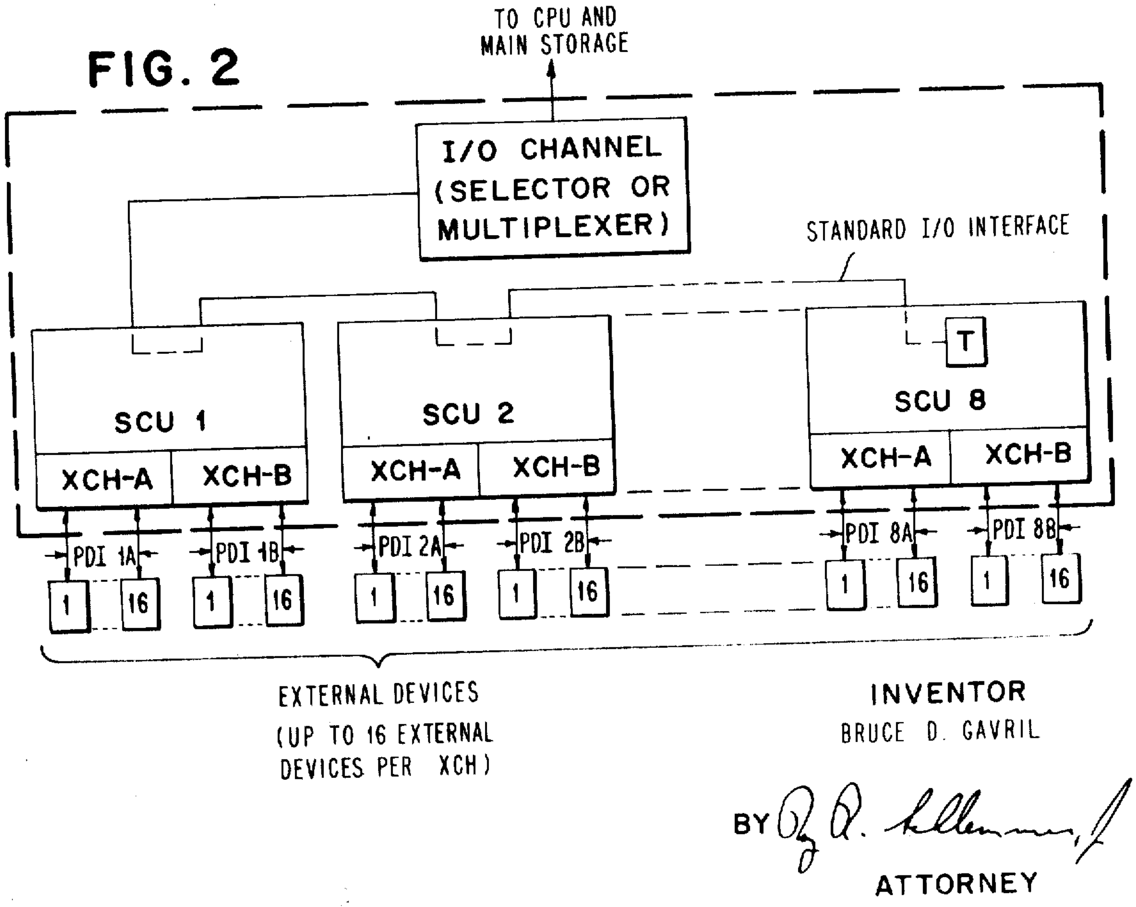
FIG. 2 is a functional block diagram illustrating a plurality of Special Control Units constructed in accordance with the present invention attached to a I/O channel of a central computing system.

The SCU occupies one electrical position on the interface, thereby allowing up to 8 SCU's to be attached to a single channel. Since each SCU provides two Parallel Data Interfaces of its own, a single channel interface may be effectively transformed into from 2 to 16 separate interfaces, as shown in FIG. 2. These multiple interfaces may be operated either separately or jointly, depending upon the type of channel involved.

When attached to a selector channel, the SCU runs in burst mode, and only a single PDI can operate at one time. When in burst mode, the SCU will operate at its maximum speed. Overall data rates are limited only by cable lengths and the channel to which the SCU is attached.

Aggregate data rates with both Transmission Channels (XCH's) in concurrent operation on multiplexor channel will depend primarily upon the responsiveness of the channel itself and the location of the SCU on the I/O Interface. High performance in multiplex-mode is achieved in the SCU by overlapping operations wherever possible. When one XCH has completed its data transfer sequence, the other XCH immediately requests channel service via the Transmission Switching Section (XSS) if it needs service.

Figure 3:
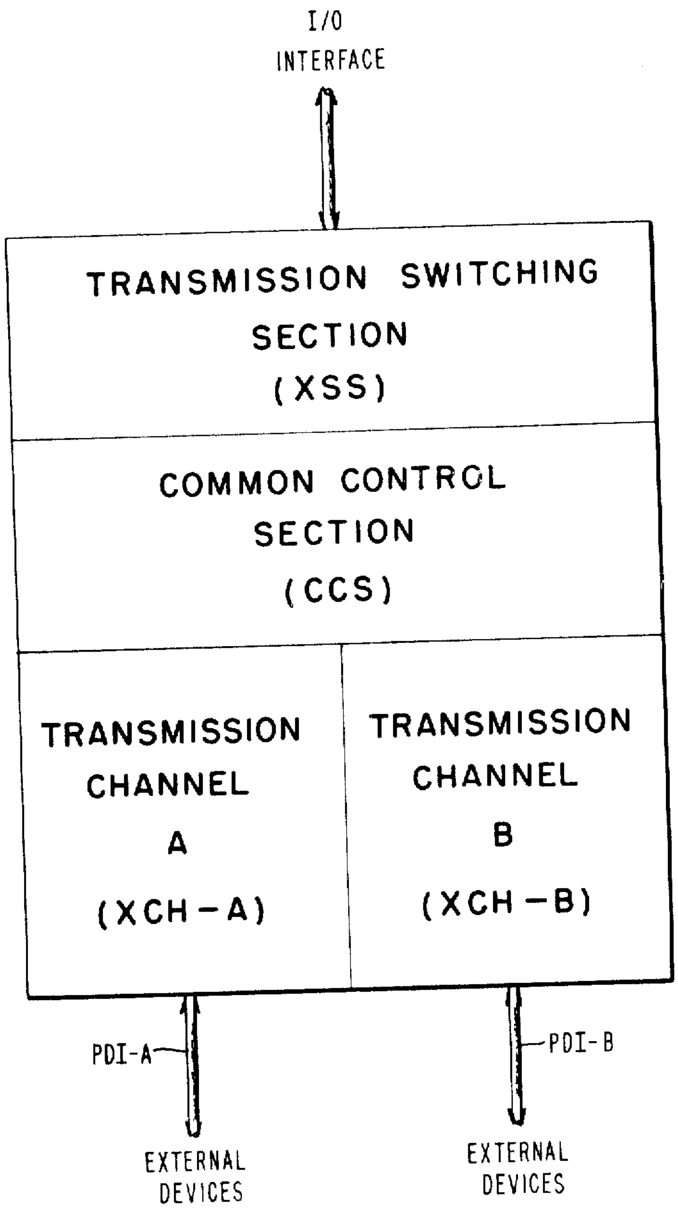
FIG. 3 is an organizational drawing showing the functional components of the present control unit.

Referring now to FIG. 3, the Special Control Unit (SCU) is divided into four sections: the Transmission Switching Section (XSS), the Common Control Section (CCS), and two identical independent Transmission Channels (XCH's).

The XSS provides the single, shared electrical path between the SCU and a single System I/O Interface. Since its facilities are shared by the two operating sections of the SCU, it contains the common logic not individually duplicated in each operating section. This common logic includes metering facilities, off-line testing facilities, drivers and receivers for the I/O Interface, and circuits for properly handling the communication sequences and generating the control lines needed by each XCH.

The Common Control Section (CCS) contains the Common Control Register (CCR) and other logic required for expanded data bus operation. The CCS also contains the internal bus gating and controls for External Mode operation. Priority controls for the two transmission channels (XCH) are also included in the CCS.

The basic operating section of the SCU is its Transmission Channel (XCH). Each SCU contains two, identical Transmission Channels, XCH-A and XCH-B. These sections may operate separately in burst mode or concurrently in multiplex mode. In the latter case they share the facilities of the XSS as it switches back and forth between them.

Each XCH contains the drivers and receivers for the Parallel Data Interface (PDI), the Data Registers and their controls, the Status Register, the Sense Register, the Command Register, the Transmission Control Register, the Address Assignment Register and the Device Address Register. The XCH controls the transfer of data across the PDI and performs control functions required by the System channel and the external device.

Referring now to the block diagram of FIG. 4, the purpose and function of the various registers will be described. The Address Assignment Register (AAR) contains the 4-bit XCH address. During initial selection and also during XCH-initiated sequences, it is presented to the channel with the content of the DAR for an address compare. It can be set in two ways, depending on the condition of the AAR mode switch. In Interface mode, the condition of the AAR-in Bus is placed in the AAR when "AAR Request-In" is up and when certain other conditions are satisfied. When the AAR has been set, the XCH will respond with "Address Accepted-out." In manual mode the condition of the four AAR toggle switches (set manually) is used for the high-order bits of the XCH address.

The Device Address Register (DAR) contains the four low-order bits of the Unit Address association with the last executed Start I/O instruction directed to the XCH. This register is set during initial selection from Bus-Out when Address-Out is raised. When the XCH requests service from the channel, it places the contents of the DAR on Bus-In bit positions 4—7 and the contents of AAR on Bus-In bit positions 0—3 and raises "Address-In." The XCH also places the contents of DAR on the DAR-Out lines and raises "DAR Ready-Out" whenever the contents of the DAR are valid, i.e., whenever the DAR is not in the process of being changed. The content of the DAR is not affected by either TEST I/O or Halt I/O instructions, or when the XCH returns Busy and Status Modifier Bits to the Channel in response to Start I/O.

The Transmission Control Register (XCR) is loaded by a CONTROL INTERNAL command and read by a SENSE INTERNAL Command. When the XCH is in multiplex mode, the XCR controls the number of bytes which will be sent across the interface before "Operational-in" falls. The XCR is a 2-bit register containing the transmission control latch (XCL) and the Attention Enable/Disable Latch. The XCL allows the SCU to utilize the 360 I/O Interface more efficiently when operating with a slow device. The following table illustrates the use of the XCL:

| Desired width of PDI interface | Number of bytes transferred per selection sequence | |
|---|---|---|
| | XCL=0 | XCL=1 |
| 1 byte | 1 | 2 |
| 2 bytes | 2 | 4 |
| 3 bytes | 3 | 6 |
| 4 bytes | 4 | 8 |

The 8-bit Command Register contains the command to the SCU received over the I/O Interface during initial selection. These commands direct the operation of the SCU and include all six basic interface commands of System/360: Read, Write, Read Backward, Control, Sense, and Test I/O. In addition the SCU uses all remaining command modifier bits for expanded capability. The full range of this capability is illustrated in the following table:

| Basic command: | Number of variations |
|---|---|
| Read | 48 |
| Write | 48 |
| Read backward | 12 |
| Control | 5 |
| Sense | 7 |
| Test I/O | 1 |

The XCH Status Register contains the eight bits which define the current status of the XCH. The Status Register conforms completely to IBM System/360 architecture and has the following format:

| Bit position: | Designation |
|---|---|
| 0 | Attention. |
| 1 | Status Modifier. |
| 2 | Control Unit End. |
| 3 | Busy. |
| 4 | Channel End. |
| 5 | Device End. |
| 6 | Unit Check. |
| 7 | Unit Exception. |

The content of the Status Register (the XCH status byte) is transmitted to the channel under a number of circumstances and provides the basic control message from the XCH. Upon acceptance of status by the channel, the Status Register is reset.

The 8-bit XCH Sense Register provides additional information concerning the operation of the command last executed. A nonzero content for this register is always indicated to the program by means of the Unit Check bit (bit 6) of the XCH status byte. The content of the Sense Register is sampled by the channel program through execution of a SENSE INTERNAL command. The Sense Register is always reset during initial selection except when the command so loaded does nothing more than extract status. This occurs with TEST I/O and No Operation Control Immediate. The Sense Register is not reset when it is sensed.

It is important to note that the Sense Register is identified with operation of the XCH of the SCU and not with the attached device. (Sense information may be extracted separately from the device by means of the SENSE NORMAL command and will depend upon the particular design of the attachment hardware).

The Data Registers are used for assembling and disassembling data to be transferred over the PDI. Two 16-bit Data Registers are provided for each PDI. During an information transfer, one register is connected to the PDI and the other register is connected to the system interface.

The Common Control Register (CCR) is loaded by a CONTROL INTERNAL command, and read out by a SENSE INTERNAL command. The CCR controls the expanded bus facilities of the SCU. It is common to both XCH's of the SCU. It can be changed by either XCH, but only when the other XCH is not in the Run State. When in expanded bus mode, only one XCH can operate. The expanded bus operation is not allowed when operating in external mode. (See Modifier Bit and Special Functions).

The SCU is capable of executing six basic commands: Read, Read Backward, Write, Control, Sense and Test I/O. Each of these commands has modifier bits which define conditions in the XCH during the execution of the command giving the XCH a full repertoire of 121 commands.

The "Read" command has the following format:

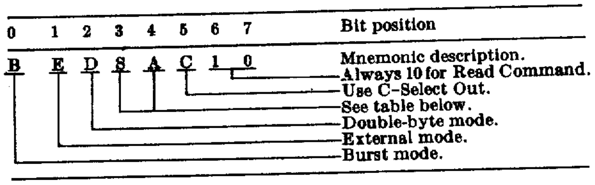

The S & A bits are examined together to define combinations of the S&A Tag-out lines.

| S | A | |
|---|---|---|
| 0 | 0 | Alternate S and A tag lines. |
| 0 | 1 | Use A-tag line only. |
| 1 | 0 | Use S-tag line only. |
| 1 | 1 | Use both S and A tag lines. |

The XCH notifies the external device of a Read Command by raising Read Select-Out and holding it up until the operation is terminated.

The "Read Backward" command has the following format:

| 0 | 1 | 2 | 3 | 4 | 5 | 6 | 7 | Bit position |
|---|---|---|---|---|---|---|---|---|
| B | E | D | T | 1 | 1 | 0 | 0 | Mnemonic designation. |
| | | | | | | | | Always 1100 for Read Backward Command. |
| | | | | | | | | Use S-tag line, if T=1, A-tag line, if T=0. |
| | | | | | | | | Double byte mode. |
| | | | | | | | | External mode. |
| | | | | | | | | Burst mode. |

The XCH notifies the external device of a Read Backward command by raising the "Read Backward Select-out" line and holding it up until the operation is terminated. The operation of Read Backward is otherwise similar to Read insofar as the SCU is concerned.

The "Write" command has the following format:

| 0 | 1 | 2 | 3 | 4 | 5 | 6 | 7 | Bit position |
|---|---|---|---|---|---|---|---|---|
| B | E | D | S | A | C | 0 | 1 | Mnemonic designation. |
| | | | | | | | | Always 01 for Write Command. |

The "BEDSAC" bits perform the same functions as noted on a "Read" command. The XCH notifies the external device of a "Write" command by raising "Write Select-Out" and holding it up until the operation is terminated.

The "Control" command has the following format:

| 0 | 1 | 2 | 3 | 4 | 5 | 6 | 7 | Bit position |
|---|---|---|---|---|---|---|---|---|
| O | R | D | E | R | N | 1 | 1 | Mnemonic designation. |
| | | | | | | | | Always 11 for Control Command. |
| | | | | | | | | Normal mode. |
| | | | | | | | | "ORDER" bits. |

The control command operates in two modes, "normal" and "internal."

In "normal" mode, bit N=1. The XCH places the "ORDER" modifier bits on "Bus-out," bits 0—4 and raises "Write Select-out" and "Order-out." The external device recognizes this as control information by the use of the "Order-out" tag line to notify the device of valid information on the bus (See tag lines). This is executed as an "immediate" command.

For "internal" mode, bit N=0. In internal mode, the XCH does not communicate with the external devices, instead "ORDER" is decoded to perform the following internal functions:

a. No Operation (ORDER=00000)

No operation is performed. The XCH will return Channel End and Device End signals to the channel and terminate initial Selection and the command.

b. Load XCR (ORDER=01000)

The XCR will request one byte of data from the channel. Bits 6—7 of this byte are loaded into the XCR. The XCH returns ending status to the channel.

c. Load CCR (ORDER=01100)

The XCH checks the other XCH for a command in progress; if the other XCH is free, the XCH will request a byte of data from the channel. Bits 4—7 are loaded into the CCR. The XCH will check these bits for a valid combination and will return ending status to the channel. If the other XCH is busy on receipt of the command, the XCH will reject the command and return unit check status to the channel (See Status).

d. Diagnostic Write (order=11100)

The XCH will request 4 or 8 bytes of data from the channel. These bytes will be used to load the data registers. If the CCR=0, 4 bytes will be requested. If the CCR≠0, 8 bytes will be requested, and the data registers of the other XCH will also be loaded. The XCH will then terminate the operation. No action occurs at the PDI other than at the DAR.

e. Invalid Command

On a Control Internal a combination of modifier bits other than the ones specified above will be considered an invalid command and the XCH will return ending status with Unit Check set indicating a command reject.

The format of the "Sense" command is as follows:

| 0 | 1 | 2 | 3 | 4 | 5 | 6 | 7 | Bit position |
|---|---|---|---|---|---|---|---|---|
| M | M | M | N | 0 | 1 | 0 | 0 | Mnemonic designation. |
| | | | | | | | | Always 0100 for Sense Command. |
| | | | | | | | | Normal mode. |
| | | | | | | | | "MMM" modifier. |

The Sense command operates in two modes—Normal and Internal. In normal mode, bit N=1. The XCH places "MMM" on "Bus-out" 0—2 and raises "Read Select-out" and "Order-out." The XCH then begins an operation that is identical with a Read operation with the exception that the "Order-out" tag line is used to signify that the XCH is ready to accept a byte of data. (See Tag lines).

In the internal mode, bit n=0 and the XCH does not communicate with the external devices. "MMM" is decoded to perform the following internal functions:

a. Read Zero Flag, MMM=000

The XCH in the SCU will request service from the Channel and will transmit one byte of zeros to the channel. The XCH will then terminate the operation.

b. Read Sense Register, MMM=001

The XCH will request service from the Channel and will transmit the contents of the Sense Register to the channel. The XCH will then terminate the operation.

c. Read XCR, MMM=010

The XCH will request service from the channel and will transmit the contents of the XCR (bits 6 & 7) to the channel. Bits 0—5 will be zeros. The XCH will then terminate the operation.

d. Load CCR, MMM=011

The XCH will request service from the channel and will transmit one byte of data to it. Bits 4—7 of this byte will contain the contents of the CCR, bits 0—3 will be zeros. The XCH will then terminate the operation.

e. Read Residual, MMM=100

The XCH will request service from the channel and will transmit 1—8 bytes of data to the channel. The number of bytes transmitted will depend on the condition of the data register controls. The XCH will then terminate the operation.

f. Diagnostic Read, MMM=111

The XCH will transmit 4 or 8 bytes of data to the channel. The number of bytes transmitted will depend on the setting of the CCR. If CCR=0, 4 bytes will be sent; if CCR≠0, 8 bytes will be sent. The XCH will then terminate the operation.

g. Invalid Command

On a Control Internal, a combination of modifier bits other than the ones specified above will be considered an invalid command and the XCH will return ending status with bits set indicating an invalid operation.

h. TEST I/O

The command byte is all zeros for a test I/O operation. If the

XCH is busy (Run state), a busy status is returned to the channel; the status register is not affected. If status is pending, it will be returned to the channel. If the 4 lower order bits of the Unit Address do not agree with the contents of DAR, and the XCH is busy, a status message of Busy and Status modifier is returned to the channel.

Interaction with the I/O Interface

The SCU is designed for attachment to a Multiplexor Channel and when attached to such channel the SCU will be capable of operating in either burst or multiplex mode under the program control. The SCU will also attach to a conventional Selector Channel.

Under certain circumstances it is necessary for the attached control unit to inform the program (via the channel) of its condition or status. Such information is delivered to the channel within a uniformly encoded control byte, called the Unit Status Byte. Each XCH of the SCU has a single, independent, 1-byte Unit Status Register. Its content is transmitted to the channel in four basic situations:

A. At the termination of an initial-selection sequence.

B. At the termination of various operations at the XCH.

C. In response to interrogation via TEST I/O.

D. In response to PDI-initiated interrupts. When a status byte is presented and accepted by the channel, the XCH status register is immediately reset.

XCH Status Byte

Each XCH of the SCU contains an 8-bit Unit Status Register in which the status conditions are stored. The format and the conditions under which the status latches are set are designed to conform in every way with System/360 I/O interface architecture, as defined in the IBM Systems Reference Library Manual SRL A22-6343.

The status byte has the following format:

| Bit Position: | Designation |
|---|---|
| 0 | Attention. |
| 1 | Status Modifier. |
| 2 | Control Unit End. |
| 3 | Busy. |
| 4 | Channel End. |
| 5 | Device End. |
| 6 | Unit Check. |
| 7 | Unit Exception. |

The particular significance of each of these conditions is as follows.

The "Attention" status bit is set solely by the occurrence of the Attention-in pulse. It may occur in combination with other status bits to define a variety of asynchronous conditions occurring at the PDI. If Channel End and Device End status disappears, this condition indicates that the command in progress was interrupted by the Attention-in pulse. Presentation of Attention status to the channel causes command chaining to be suppressed.

The "Status Modifier" bit is used by a XCH for three purposes:

1. To indicate that a XCH is busy.
2. To indicate that an external device wishes to skip a channel command.
3. As a modifier for PDI Interrupt signals.

The status Modifier bit and the Busy bit are used during initial selection to indicate that the XCH has a command in progress for a device other than the one addressed by the four low-order bits of the Unit Address (in a different value from that already latched in the DAR). The XCH is either busy with the actual operation or has status pending. In this way the program may distinguish a busy XCH from an otherwise available external device. Whenever a status message containing only Status Modifier and Busy is transmitted to the channel, the Control Unit End bit will later appear in the terminating status byte for the command in progress. This special "XCH busy" message can occur only during a channel-initiated selection sequence. When it occurs as a result of TEST I/O, the data path (channel, subschannel, etc.) is not relieved of any possible pending status since the unit address does not agree with the command in progress. START I/O can cause this response only under two circumstances: (a) when a different nonshared subchannel of a multiple or channel is used or (b) when the same shared subchannel has been previously released via a Channel End which has cleared the subchannel: Case (b) applies also to the Selector Channel. In no case is the DAR reset when this special status is retained during initial selection.

The appearance of the Status Modifier bit together with the Busy bit is entirely independent of the operation or condition of the Skip-In line of the PDI. Status bit 1 is set under these circumstances solely by the internal controls of the XCH and is not mixed with any possible pending status which may already include the status modifier bit. It should be noted that a XCH cannot be interrogated while it is executing an internal-mode command (control internal or sense internal) since these commands operate in burst mode. Any attempt to execute TEST I/O or START I/O will be terminated by the channel controls, and Condition Code 2 will be set at the CPU.

The external device may force the channel to skip the next sequential CCW during command chaining. It can do this only by simultaneously raising EOR-In and Skip-In. The Skip-In pulse sets the Status Modifier bit, and if no additional status bits are present other than Channel End and Device End (or Device End alone), the channel controls will subsequently skip the otherwise next sequential CCW.

The Skip-in line is also sampled simultaneously with either Attention-In or EOF-In. Thus, the external device may use the Skip-In pulse to double the number of possible unique interrupt signals by causing the XCH to set the Status Modifier bit. In the event that such an interrupt occurs while ending status containing the Status Modifier is already pending (i.e., from a previous EOR-In and Skip-In signal), the skip request is automatically cancelled by the appearance of the other interrupt status bit. This implies, of course, that if the interrupt includes Skip-In, the Status Modifier remains on. On the other hand, if the interrupt does not include Skip-In, the Status Modifier bit in the pending status is turned off.

The Control Unit End bit is used by a XCH of the SCU for a single purpose, namely to indicate to the program that the XCH had been previously interrogated while in the busy condition and had then transmitted to the channel a status message consisting of Status Modifier and Busy. If the XCH had not been previously interrogated, the Control Unit End bit is not set. It always appears along with the normal ending status for the command which had been in progress during the interrogation. The Control Unit End bit is useful in a multiprogramming environment where it can alert the monitor that another program has attempted to get at a device sharing the PDI of the XCH involved. Presumably, such an occurrence would be queued in the monitor for later identification when signalled by the appearance of Control Unit End. This status bit thus indicates to the program that the XCH of an SCU is potentially available for another unrelated operation. Control Unit End status is also used with Unit Check to signal an improper use of the AAR Request-In line. Control Unit End always causes command chaining to be suppressed when it appears at the channel.

The Busy bit is set only during an initial selection sequence when the XCH cannot execute the command because a previously initiated command is in progress. There are, therefore, two conditions under which this can occur:

B—The previously initiated operation is still being executed and end status is not yet available; and P—Status is pending in the XCH.

A XCH of the SCU operates under these circumstances in the following manner:

Case I: The Unit Address agrees with the address formed from the content of the AAR and DAR.

| START I/O | TEST I/O |
|---|---|
| B Busy Status alone is returned to the channel. (This situation is possible only when Channel End has previously cleared the subchannel; the subchannel would otherwise appear busy to the instruction). | B Busy status alone is returned to to the channel. (On a Selector Channel this situation is possible only when Channel End has been previously sent to the channel). |
| P Busy Status is set to pending status, and the resulting status byte is transmitted to the channel. (The same condition as for B also applies here). | P The pending status is extracted from the XCH. The Busy bit is *not* set. (On a Selector Channel the same condition as for B applies here). |

Case II: The low-order 4 bits of the Unit Address do not agree with the content of the DAR.

START I/O AND TEST I/O

The Busy bit and the Status Modifier bit are set together and this message is returned to the channel to complete the initial selection sequence. If status is pending, it is not extracted. The appearance of the Busy bit with other status bits in response to START I/O thus notifies the program that the CSW refers to the command previously executed by the Addressed Device and not to the command being attempted. The XCH does not reset the DAR when Bush status is returned to the channel. The Busy bit may appear alone with Channel End in Case I-B. This will occur when Channel End has been stacked in the subchannel prior to the execution of TEST I/O. The TEST I/O will relieve the subchannel of pending status during the busy sequence. The appearance of Busy status at the channel always causes command chaining to be suppressed. This implies that the TEST I/O instruction, or even START I/O, will terminate command chaining if they result in an I/O interface selection sequence.

The Channel End bit is generated by a XCH whenever it has accepted a command and no longer needs channel service. This may occur during either initial selection or at the end of command execution. The XCH will set Channel End only once for each command accepted. When Channel End appears during initial selection, it will appear alone to indicate the acceptance of the following immediate-type commands:

Control Normal
Read External
Write External
Read Backward External

When a command is terminated, either normally or by some exceptional condition at the XCH, Channel End and Device End are usually set concurrently. If, however, the command is an immediate command, only Device End will be set since the Channel End status has already been retransmitted to the channel during initial selection. Another exception occurs when the channel terminates a command, and the device responds to Stop-Out at the PDI with Proceed-In. The XCH will immediately set Channel End under these circumstances and attempt to transmit to the channel. If the channel is not masked for I/O interrupts and if command chaining is not indicated, appearance of Channel End status at the channel, either alone or with Device End, will release the subchannel involved, and the channel will so notify the program of this condition via the CSW.

Channel End may also appear alone with Busy status. This will occur during the execution of TEST I/O when Channel End has been previously stacked in the subchannel and when the XCH returns a status message containing only the Busy bit. The TEST I/O thus relieves the subchannel of pending status during the busy sequence.

It is important to note that if during initial selection a command is not accepted, Channel End status is not set. The Unit Check status bit will instead appear under these circumstances.

The Device End bit is generated whenever the XCH has completed a command that had been previously accepted. The command may have terminated normally or have been aborted, and the precise circumstances are defined by other status bits. Thus, when a command involving the PDI is in progress, Device End is set in response to the rise of the following PDI lines:

EOR-In
EOF-In
Attention-In
Proceed-In
AAR Request-In

Device End is also set by the ordinary appearance of Proceed-In during the execution of the CONTROL NORMAL command. The XCH also sets Device End when it completes execution of the CONTROL INTERNAL and SENSE INTERNAL commands.

When a command is terminated, Channel End is normally set concurrently with Device End, the exceptions being (1) when the command is an immediate command or (2) when the channel had earlier terminated the command, and the response to Stop-Out at the PDI had been Proceed-In. In both of these cases Channel End has already been generated by the XCH. Device End thus notifies the program that the XCH and its associated devices are ready for another command. It occurs only once for each command accepted by the XCH.

The Unit Check bit is set whenever sense information is generated by the XCH as a consequence of certain exceptions. The appearance of Unit Check thus indicates to the program that a nonzero sense byte is pending in the Sense Register of the XCH. Such sense information may then be extracted by one of the SENSE INTERNAL commands.

When Unit Check occurs during initial selection, it indicates that the XCH did not accept the command. It appears without either Channel End, Control Unit End, or Device End. Such a condition indicates that no action was taken by the XCH in response to the command, other than setting the appropriate bits of the XCH Status Register. If Unit Check occurs while the command is in progress, it is set with any combination of Channel End, Control Unit End, and Device End, depending upon the circumstances under which the Unit Check occurred. Errors detected in the absence of a command in progress are not transmitted to the channel either until one of the PDI Interrupt signals occurs or until the next initial selection sequence. In the latter case the command will be rejected with the appearance of Unit Check. If during a busy condition the XCH detects an invalid command code or invalid command code parity, it responds to the interrogation in the usual manner, i.e., with the busy indication (and/or with pending status, if it exists). Unit Check is not set by the XCH. Presumably, the error will be detected later if it subsequently reoccurs.

The unit Exception bit is set solely by the occurrence of the EOF-In pulse under only two circumstances:

1. When a command is in progress (i.e., Select-Out lines are up).

2. When Select-Out lines are down, only if EOF-In occurs simultaneously with Attention-In.

When a command is interrupted, Channel End and Device End (or Device End alone) are also set together with any other indications that are required. The appearance of Unit Exception at the channel will cause command chaining to be suppressed.

Operation of Parallel Data Interface (PDI)

As stated previously, the SCU consists essentially of two identical Transmission Channels (XCH's) capable of either independent or joint operation. Each XCH provides its own Parallel Data Interface (PDI) for the attachment of external devices.

Each PDI contains sufficient data, selection, tag, control, and address lines to provide for the attachment and operation of almost any device (See FIG. 5). For those devices not requiring an entire PDI, its electrical design will allow simple termination of unused lines at the connectors.

The Data Bus is used for the transfer of information between a XCH of the SCU and the attached parallel data device (PDD). It consists of a Bus-In and Bus-Out.

The Bus-out consists of 16 information lines driven directly by the output buffer registers of the SCU. It is used to transmit data, orders, or sense requests to the PDD, as defined by the tag-Out and selection lines of the PDI.

The Bus-Out is valid for sampling by the PDD only when the appropriate tag-Out and select lines are up. The bus will remain valid until these lines are dropped in response to Proceed-In.

The Bus-In consists of 16 information lines driven by the attached PDD. It is used to transmit data or sense information to the SCU.

Bus-In is sampled by the SCU only when the appropriate select and tag-Out lines and Proceed-In are up. The information on Bus-In must be valid and deskewed before the PDD raises Proceed-In, and this information must not change while Proceed-In is up.

The selection lines 4 provide a simple means of defining to the PDD the command being executed by the XCH. Each selection line is driven by the SCU, and at least one is used with every command. In addition, one common select line (C-Select) is available for certain commands at the option of the program. Each select line is up during the entire execution of the associated command, and all select lines have the same timing characteristics. The select lines fall only when the System/360 channel has accepted ending status from the XCH.

The selection lines may be used by the attached PDD for setting latches, gating, or any of a variety of other purposes.

The Write Select-Out line is up during the execution of either a WRITE command or a CONTROL NORMAL command. These two commands are distinguished from one another through the concurrent use of a tag-Out line associated with each command.

The Read Select-Out line is up during the execution of either a READ command or a SENSE NORMAL command. These two commands are distinguished from one another through the concurrent use of a tag-Out line associated with each command.

The Read Backward-Out line is up only during the execution of a READ BACKWARD command.

The C-Select-Out line is up during the execution of either a READ command or a WRITE command only when bit 5 of the command byte is on. Its timing is identical with either the Read or Write Select lines.

The C-Select line may be used by the external device for a variety of gating purposes. These include use with the tag-out lines to double these facilities or for device selection during command chaining.

The tag lines provide the signals which control the exchange of information on a demand/response basis over the data bus. Three separate, program selectable, tag-Out lines are provided to indicate a ready condition at the SCU, and at least one line is used with each command. These multiple tag lines also provide a means of directing or requesting data to or from different facilities in the attached device. Stated differently, the provision of multiple tag lines effectively extends the hardware selection and control capability of the PDI.

The tag-Out lines are driven by the SCU and always initiate an information transfer cycle. The PDD normally responds by raising the Proceed-In line to complete the cycle.

The SCU will not raise the tag-Out lines in the presence of either Proceed-In, EOR–In, EOF–In and/or Attention-In. Under such circumstances (with the exception of Proceed-In) the SCU will terminate the current command and set Sense bit 6. An up condition of Proceed-In resulting from failure to drop this line during the previous PDI cycle merely prevents the tag-Out line/s from rising. The active tag-Out lines are otherwise reset upon detecting the rise of Proceed-In, EOR–In, EOF–In, and/or Attention-In. The last three situations will also terminate the sequence.

The S-tag-Out line is used only with the WRITE, READ, or READ BACKWARD commands. It is selectable under program control by means of bits 3 and 4 of the command (bit 3 only in the case of READ BACKWARD). The rise of S-tag-Out has the following significance:

WRITE Command—The rise of S-tag-Out notifies the external device that the SCU has placed a data word on Bus-Out. The SCU stabilizes and deskewes the data before it raises this line. Bus-Out remains unchanged while S-tag-Out is up.

READ or READ BACKWARD—The rise of S-tag-Out notifies the external device that the SCU is ready to accept a data word over Bus-In. Its subsequent fall indicates that the SCU has accepted the data word.

The A-tag-Out line is functionally identical with the S-tag-Out line and is similarly selectable under program control. It may be used either separately or jointly with the S-tag-Out line, thereby providing an additional hardware facility for controlling the associated information transfer. One mode of operation, available only with READ or WRITE commands, allows alternate cycling of A-tag and S-tag during the data transfer sequence.

The Order-Out line is used only during the execution of the CONTROL NORMAL, or SENSE NORMAL commands. It has the following significance:

CONTROL NORMAL COMMAND—NORMAL The rise of Order-Out notifies the external device that the XCH has placed a 5-bit ORDER on lines 0—4 of Bus-Out. The XCH stabilizes and deskewes this information before it raises this line.

SENSE NORMAL COMMAND—The rise of Order-Out notifies the external device that the SCU is ready to accept a 16-bit sense word over Bus-In. In addition, the initial rise of Order-Out during the sensing sequence notifies external device that the SCU has also placed a 4-bit sense modifier MMM1 on lines 0—3 of Bus-Out while clearing lines 4—15. (The content of Bus-Out subsequently remains unchanged for the entire execution of the SENSE NORMAL command).

The external device may distinguish these two commands from one another through the concurrent use of the Read and Write Select lines. Order-Out and Write Select define the CONTROL NORMAL command while Order-Out and Read Select define the SENSE NORMAL command.

The Proceed-In line is used with all commands in response to the rise of the associated tag-Out lines. Only a single Proceed-In response should occur for each PDI cycle. The rise of Proceed-In has the following significance:

WRITE or CONTROL NORMAL Commands—The Proceed-In signal signifies that the external device has accepted the information on Bus-Out. (It also terminates CONTROL NORMAL).

READ, READ BACKWARD, or SENSE NORMAL COMMANDS—The Proceed-In signal notifies the SCU that the external device has placed valid and stabilized information on Bus-In. This information must remain unchanged for the duration of the Proceed-In signal.

The Proceed-In signal may be transmitted to the SCU as a pulse, in which case its fall may possibly precede the fall of the associated tag-Out line. It should be noted that the pulse must be of sufficient duration during input operations to allow the XCH to sample Bus-In. On the other hand, if the external device fails to drop Proceed-In, the XCH will not again raise the tag-Out line/s until Proceed-In falls. This "hold-off" feature can be useful in many applications.

The Control lines include a miscellaneous grouping of lines which complete the control facilities of the PDI. They include the termination, interrupt, and skip signals.

The Stop-Out signal, generated by the XCH after it receives a Channel Stop signal from the System is used to inform the external device that the XCH will neither accept (input operations) nor transmit (write operation) further information on the data bus. The Channel Stop indicates to the XCH of the SCU that either the channel word count has been exhausted or that the CPU has issued a HALT I/O instruction.

Stop-Out is raised simultaneously with S-tag-Out and/or A-tag-Out (WRITE, READ, READ BACKWARD commands)

or with Order-Out for the SENSE NORMAL command. It is not used with the CONTROL NORMAL command. It remains up until the corresponding selection line/s fall in response to EOR, EOF, and/or Attention driven by the external device. If the response to Stop-Out is Proceed-In only, the XCH continues the demand/response control sequence until terminated by the device. On the other hand, if the response to Stop-Out is Proceed-In and EOR–In, etc., the XCH merely ignores Proceed-In.

The End of Record (EOR)–In pulse is used to notify the SCU that the external device has completed its operation and that it will neither transmit nor receive further information over the data bus of the SCU. Normally, the XCH of the SCU will then set the Channel End and Device End bits of the Unit Status Byte and terminate the current command. Command chaining at the System channel is permitted under these circumstances.

If EOR–In is raised concurrently with Proceed-In in response to S-tag-Out and/or A-tag-Out during a WRITE operation, this notifies the SCU that the attached device has accepted the current data word on Bus-Out but that it will not accept further data. In the case of input operations the concurrence of these signals has a corresponding significance.

The EOR–In pulse is ignored by the SCU when no command is in progress (i.e. when the selection line/s are down).

The End of FIle (EOF)–In pulse has two separate functions. The basic function is to notify the SCU that the external device has completed its operation, that it will neither transmit nor receive further information over the data bus, and that it wishes to terminate operations initiated by the associated START I/O instruction. Normally, the SCU will then set the Channel End, Device End, and Unit Exception bits of the Unit Status Byte and terminate the current command. The presence of the Unit Exception bit will prevent any further command chaining and thus terminate the channel command sequence previously initiated by the START I/O instruction. When EOF–In is used with Attention-In and Skip-In, additional command chaining termination signals are available.

If EOF–In is raised concurrently with Proceed-In in response to S-tag-Out and/or A-tag-Out during the execution of a WRITE command, this notifies the SCU that the attached device has accepted the current data word on Bus-Out, but that it will not accept further data.

The second function of the EOF–In pulse is to act as a modifier for the Attention-In pulse. As will be seen, EOF–In and Attention-In are operationally identical, except that EOF–In cannot alone generate an I/O interrupt in the absence of an active command within the XCH of the SCU.

The Unit Exception bit of the SCU Status Byte is set only by the EOF–In pulse during the execution of all commands. This status bit may, therefore, be identified solely with the EOF–In pulse. The unique use of EOF–In to set the Unit Exception status bit is similar to the unique use of the Attention-In pulse to set bit 0 of the Unit Status Byte. The systems designer may, therefore, jointly use the Attention-In pulse and the EOF–In pulse to define a unique ending condition directly to the program through the concurrent appearance of the Attention and Unit Exception bits in the Unit Status Byte. Such a design provision effectively provides an alternate ending signal to the system designer.

The EOF–In pulse is ignored by the SCU when no command is in progress (i.e. when the selection line/s are down), except when it occurs with the Attention-In pulse. When used in this manner the EOF pulse becomes a modifier for the Attention pulse and provides another distinct interrupt signal.

EOF–In is thus quite similar in its action to Attention-In except that it cannot be recognized alone with no command is in progress.

The Attention-In pulse allows the external device to asynchronously signal the CPU, by means of an I/O Interrupt, that it requires service. The usual response of the program will be to initiate a SENSE NORMAL command to further define the condition.

The rise of Attention-In always causes the Attention bit (bit 0) of the Unit Status Byte to be set, and this is the only mechanism by which this bit is set. If the Attention-In pulse occurs during the execution of any command (i.e., while a selection line is up), the command will be immediately terminated, and the Channel End and Device End bits of the Unit Status Byte will also be set. Command chaining will be inhibited under these circumstances.

If Attention-In is raised concurrently with Proceed-In (in response to S-tag-Out and/or A-tag-Out) during the execution of a WRITE command, this notifies the SCU that the external device has accepted the current data word on Bus-Out, but that it will not accept further data. A corresponding situation exists in the case of input commands. The SCU is thereby notified that the current content of Bus-In is the last data word that will be transmitted. The SCU will attempt to transfer this word to the channel.

The Attention-In pulse may be used simultaneously with EOF–In and/or Skip-In to define four interrupt conditions to the program by means of concurrent use of the Attention, Status Modifier, and Unit Exception bits of the Unit Status Byte. The following signals are recognized by the SCU when no command is in progress (i.e., when the PDI Select-Out lines are down):

1. Attention-In
2. Attention-In and EOF–In
3. Attention-In and Skip-In
4. Attention-In and EOF–In and Skip-In If EOF–In and/or Skip-In are raised in the absence of Attention-In, they are simply ignored by the SCU when the Select-Out lines are down.

However, when a Select-Out line is up, the EOF–In pulse is separately recognizable, Attention-In, EOF–In, and Skip-In thus provide the external device with six unique command chaining termination signals. These include the four combinations already described plus two additional signals:

5. EOF–In
6. EOF–In and Skip-In

A special situation occurs when either (a) an interrupt signal occurs concurrently with EOR–In or (b) when an interrupt signal is received by a XCH after a command has been terminated normally by EOR–In, but before ending status has been transferred to the System/360 channel. This results in a Unit Check with Sense Bit 7 defining a Command Exception. This facility actually increases the number of separately recognizable command chaining termination signals to 12.

The Skip-In pulse enables the external device to set the Status Modifier Bit (bit 1) of the XCH Status Byte. It must coincide with either Attention-In, EOF–In or EOR–In in order to be detected by the SCU. It is used for two purposes:

a. To control the channel command sequence
b. As a modifier for PDI interrupt or termination signals.

When a command is terminated by EOR–In and Skip-In, the XCH adds the Status Modifier Bit to the ending status that is then set to the channel. If the only other status bits are Channel End and Device End (or Device End alone), the channel will skip the next sequential channel command. The normal sequence of commands will not be modified, however, if any other status bits are present.

Whenever an interrupt signal (which does not include Skip-In) occurs after a command has been terminated normally by EOR–In and Skip-In, but before ending status has been transferred to the channel, the Status Modifier Bit is turned off. A Unit Check and Command Exception occur as usual, however.

It should be noted that the SCU Skip-In signal has no connection whatever with the Skip Flag of a System/360 CCW used during data chaining.

As described previously each transmission channel (XCH) of the SCU is provided with two functionally distinct 4-bit address registers, namely the Device Address Register (DAR) and the Address Assignment Register (AAR). The DAR is automatically loaded by the XCH during initial selection with the low-order 4 bits of the Unit Address defined by the associated START I/O instruction. The AAR, on the other hand, may be loaded by an external device or by toggle switch settings at the SCU. Its content defines the address by which the SCU transmission channel is recognized over the System Interface. Manipulation by the systems designer of the content of the AAR must be carefully coordinated with all other functions of the PDI.

The Device Address Register (DAR)–Out comprises four lines which carry the content of the DAR to the external equipment. They are valid whenever the DAR Ready-Out line is up.

The DAR–Out lines provide four separate gating lines to the external device which can be used for a variety of purposes including device selection. With the addition of external decoding facilities, the effective number of DAR–Out lines may, of course, be increased to sixteen.

The DAR Ready-Out line defines valid states of the DAR which occur under either of the following two conditions:

a. command in progress b. pending PDI interrupt status byte

When the DAR is being changed, or when neither condition a. or b. is present, the DAR Ready-Out line is down.

When a PDI interrupt signal occurs in the absence of a command (i.e., when the PDI Select-Out lines are down), the XCH raises the DAR Ready-Out line to notify the device that the interrupt was taken and that the XCH is attempting to transfer the interrupt message to the channel (the original content of the DAR is unaffected). When the status byte is subsequently accepted by the channel, the DAR Ready-Out line then falls to complete the interrupt sequence. Any other interrupt signal occuring while the DAR Ready-Out line is up under the circumstances may or may not be taken by the XCH.

During command execution, the timing of the DAR Ready-Out line coincides with that of the selection lines of the PDI. It is effectively the result of a three-way OR within the XCH of the three primary selection lines and serves as a universal PDI Select-Out line.

The DAR Ready-Out line also operates with internal mode commands, and its up condition in the absence of PDI Select-Out lines defines the presence of an in-progress internal-mode command. For these commands therefore, the DAR Ready-Out line is effectively a phantom PDI Select-Out line. The systems designer can use this facility to notify the attached device of the execution of internal-mode commands. When command chaining is absent, specific internal-mode commands may be defined to the external device, if desired, through various settings of the DAR itself.

The Address Assignment Register (AAR)–In comprises four lines which are sampled by the XCH, and the content is used to reset the AAR only when the AAR Request-In line of the PDI is up and when certain other conditions are also satisfied. In order for the AAR to be reset, however, the AAR Mode Switch provided on the SCU control panel must be in the appropriate position. Whenever the XCH accepts the information on AAR–In, it will respond to the AAR Request-In signal with the Address Accepted-Out pulse.

The AAR–In lines may be driven by any external device as well as by Bus-Out or DAR–Out of the other PDI of the same SCU. Direct Control facilities of the CPU itself may also be used.

The AAR Request-In line provides two facilities to the designer. Its basic function is to notify the XCH that the external device wishes to reset the AAR. It may also be used under different circumstances as an additional PDI interrupt signal. The choice between these two functions is determined by the setting of the AAR Mode Switch referred to above and the two modes of operation are described separately in the paragraphs which follow.

I AAR Mode Switch in "PDI" Position

In this mode the AAR Request-In line is used to initiate a change in the setting of the AAR. It is raised by the external device after the latter has placed valid and stabilized data on the AAR–In lines. The XCH may or may not respond at once to the request, depending upon the condition of other controls under cognizance of the XCH. However, when the content of the AAR–In lines are sampled by the XCH and become the new content of the AAR, the XCH will notify the external device of the transition by providing the Address Accepted-Out pulse. The AAR Request-In line should then be dropped immediately.

The response of the XCH to AAR Request-In will depend upon whether or not a command is in progress.

a. No Command in Progress

In this condition the XCH is idle, and it will respond at once to AAR Request-In, provided that the Address-Out line of the System/360 I/O Interface is down. If Address-Out is up, the XCH will respond as soon as Address-Out falls, unless the signal is associated with an initial selection sequence for the same XCH.

If a PDI interrupt occurs just prior to the rise of AAR Request-In, the later will be ignored until the interrupt identification status byte is transmitted and accepted by the System/360 channel. (The completion of the interrupt sequence is defined by the fall of DAR Ready-Out). The systems designer should be aware of that under these circumstances; the XCH will subsequently have an address different from that associated with the interrupt.

b. Command in Progress

Operation here depends upon the type of command being executed:

1. READ, READ BACKWARD, or SENSE NORMAL Commands

When either of these types of input commands is in progress, the XCH will sample AAR–In only upon receipt of Proceed-In from the external device. The appearance of the Address Accepted-Out pulse will coincide with the fall of the PDI tag-Out line. If the XCH is delayed in accepting the content of AAR–In (for example, by the concurrent appearance of Address-Out at System/360), the fall of tag-Out will be delayed. Data rates may, therefore, be affected by other channel activity when in this mode of operation.

This sequence allows the designer to synchronize PDI data words directly with their associated subchannel address when in multibyte mode. Presumably, Bus-In and AAR–In would be loaded concurrently, and Proceed-In would then be raised simultaneously with AAR Request-In.

Operation in this manner is possible only in multiplex mode and when the Multibyte Selection Register calls for normal overlapped operation of the input buffers. The XCH will simply ignore AAR Request-In when the MSR calls for any other mode of operation or when the B-bit of Read-type commands is unity (Burst mode).

2. WRITE Commands

When a multiplex-mode WRITE command is in progress, the XCH will sample AAR–In only upon the receipt of Proceed-In from the external device. Operation and timing is similar to that described for the input commands, and Address Accepted-Out will coincide with the fall of the PDI tag-Out line(s), as before.

While addresses and data words are thus entirely synchronized, the sequencing of the two is, however, different from that which occurs during the execution of input commands. The phase relationship between settings of the AAR and the data word may nevertheless be easily defined.

When the attached device accepts the $n$th data word over Bus-Out and raises Proceed-In together with AAR Request-In, the content of AAR–In must refer to the ($n$+2) data word which is yet in the System/360 memory. The ($n$+1) data word is already being processed in the assembly register of the output buffer complex. Thus, at the outset of such a sequence, the first two words must be extracted from the same subchannel (i.e., with the same setting of the AAR). All subsequent cycles, however, may refer to arbitrary subchannels, as determined by the content of the AAR–In lines.

Again, operation in this manner is possible only in multiplex mode and when the Multibyte Selection Register calls for normal overlapped operation of the output buffers (i.e., the manner in which they operate when in Burst mode). The XCH will simply ignore AAR Request-In when the MSR calls for any other mode of operation or when the B-bit of the WRITE command is unity (Burst mode).

3. CONTROL, SENSE INTERNAL, or External-Mode Commands

When any commands of this type are in progress, the XCH will simply ignore the AAR Request-In signal. No other indication is given.

Thus, the AAR cannot be reset during the execution of any internal-mode commands. Nor will it be reset when a CONTROL NORMAL is in progress. An active External Mode command of any type will also prevent the AAR from being affected.

While the AAR facilities provide foolproof protection against improper manipulation of the AAR, the systems designer must nevertheless be cognizant of all equipment activities related to this critical addressing function.

II. AAR Mode Switch in "Manual Position"

In this mode the AAR Request-In line may be used as an auxiliary interrupt signal and is identified by the presence of the "Intervention Required" sense bit of the XCH Sense Register (bit 1). If a command is in progress, however, it will not be aborted, and the interrupt is delayed.

The Address Accept-Out pulse notifies the external device that the content of the AAR–In lines have been sampled and that the AAR Request-In line should be dropped.

When no command is in progress, the pulse will appear only when Address-Out at the System is down. If a PDI Interrupt status message is pending, Address Accepted-Out will not appear until after such status is transferred and accepted by the System channel. This will be signalled by the fall of DAR Ready-Out.

When a command is in progress, Address Accepted-Out will appear only under the circumstances outlined above. Under no circumstances will Address Accepted-Out appear during the execution of internal mode, external mode (device-to-device) commands or with CONTROL NORMAL.

When the AAR Mode Switch is in "Manual" position, the Address Accepted-Out line is not associated with the AAR Request-In line, but instead, with the manual reset facilities.

It should be noted that the AAR Request-In and Address Accepted-Out lines can be directly connected to the tag-Out and Proceed-In lines, respectively, of another PDI. The other PDI may be on the same SCU. Under these circumstances the AAR is effectively an external device relative to the other PDI.

Expanded Bus Mode Operation

An additional feature of the SCU is referred to as Expanded Bus Mode. In Expanded Bus Mode, one XCH of the SCU may "Borrow" the entire 16 bit bus of the other XCH. During this mode of operation, only one XCH may be operational i.e., only one in the Run state or Stop state. The form of bus borrowing is governed by the setting of the CCR. If the CCR=0, the two XCH's operate independently. When the buses are connected as follows:

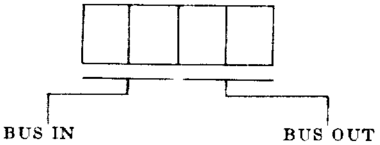

| | |
|---|---|
| CCR=XX 01 | XCHB borrowing XCHA's Bus Out. |
| XX 10 | XCHA borrowing XCHB's Bus Out. |
| XX 11 | Invalid. |
| 01 XX | XCHB borrowing XCHA's Bus In. |
| 10 XX | XCHA borrowing XCHB's Bus In. |
| 11 XX | Invalid. |

When in expanded mode, the bit configurations on the bus will be:

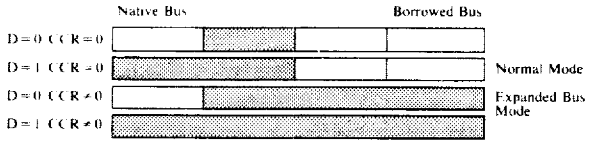

Shaded portion indicates portion of bus being used.

Expanded bus mode operation is not allowed concurrent with external mode operation. The XCH whose bus is being borrowed will appear Busy to the channel from the time of command loading in the borrowing XCH until the XCH returns Ending Status. (The borrowing XCH is in the "Run" state of "Stop" state.)

An additional very important feature of the SCU is External mode. External Mode operation provides a direct demand-response data path between a device on one XCH of a SCU and a device on the other XCH without using the 360 I/O Interface. Operation begins when the CCS recognizes two compatible External mode commands (see Command Structure) in the two XCH command registers. Compatible commands are:

| XCH A: | XCH B |
|---|---|
| Read External | Write Ex'ernal. |
| Read Backward External | Do. |
| Write External | Read External. |
| Do | Read Backward External. |

The CCS checks for compatible commands only if both "Run" latches are on. This prevents the SCU from returning a command reject when switching for a nonactive (run latch off) Read-Write combination to Write-Read combination. When in external mode, the XCH containing a Read command requests PDI service. When the service is complete, the XCH transfers the data to the other XCH one byte at a time until its register is empty. The XCH with the Write command then requests a PDI cycle to clean its data register. The writing XCH then signals the reading XCH that the data transfer is complete and another read cycle may take place. Either device may end the operation by raising the EOF–In, EOR–In, or Attention–In. The operation will be terminated with no residual data in the data registers. Both XCH's will appear "-Busy" to the channel while this operation is taking place.

Direct Device-To-Device Communication Feature

Conventional operation of the SCU as a multipath control unit provides two functionally independent paths by which devices attached to each of its two Parallel Data Interfaces may communicate with main processor storage. Information routed over System I/O interface is transferred to or from main memory under control of the System/360 channel.

A unique feature of SCU, however, provides an alternate mode of operation in which the two Parallel Data Interfaces may communicate directly with one another without disturbing either main memory or the I/O interface of the system. This important mode of operation is called External Mode and is achieved by loading a READ EXTERNAL command into the command register of one Transmission Channel (XCH) of the SCU and a WRITE EXTERNAL command into the other XCH. Under normal circumstances Parallel Data Interfaces A and B will automatically connect through the Common Control Section (CCS) of the SCU, and External Mode operation will begin and continue until terminated either by the attached devices or by a single HALT I/O instruction issued from the System CPU.

External Mode operation is not restricted by the type of System channel to which the SCU is attached. Either a selector or multiplexor channel may be used. Concurrent external mode operation may be sustained when several SCU's are attached to the same channel. Data transfer is effectively in "-burst" mode at rates independent of the channel capacity.

FIG. 6 illustrates the basic functional organization of the External Mode logic of the SCU. For simplicity, only the facilities for data transfer from XCH–A to XCH–B are shown. Actual implementation in hardware will also include the logic necessary for transmission in the reverse direction for full half-duplex communication capability.

The interconnection between the two transmission channels is seen to be accomplished within a so-called Common Control Section (CCS) of the SCU where gating lines G1 and $\overline{G1}$, respectively, enable and disable the associated circuitry.

One of the basic design objectives has been to fully utilize within the SCU the already existing hardware facilities for normal reading and writing operations. This is accomplished by substituting an 8-bit Internal Bus for the normal data path to and from the Transmission Switching Section (XSS) which connects to the system I/O interface. (This normal path is indicated in FIG. 6 by the symbol N). Similarly, the buffer control lines which normally request data service from the system are disconnected from the XSS during External Mode operation and, instead, interconnect with one another through special logic in the CCS. In FIG. 6 these control lines are the Byte Ready, Byte Accepted, Byte Request, and Byte Delivered lines.

Another design objective of the External Mode logic has been to provide an essentially transparent communication path between the two PDI's of the SCU. All data extracted from the transmitting device may ordinarily be transferred to the receiving device without any residual bytes remaining in the buffer registers of either transmission channel. This differs from a normal Read operation in which residual bytes necessarily remain within the input buffer of the XCH when the data transfer is terminated by the system channel and not by the device.

Each of the two communicating devices may operate independently in either double- or single-byte mode. The D-bit (bit 2) of the READ EXTERNAL and WRITE EXTERNAL commands is used as in conventional read/write operations. The tag line and buffer controls operate in the usual manner and provide for the proper assembly and disassembly of the data words for any combination of one or 2 byte devices.

The use of data bus expansion facilities ordinarily provided by the CCR is not available when the SCU is operating in external mode. A Command Exception will occur if such operation is attempted.

The input and output buffers operate in external mode exactly as they operate during conventional burst mode reading and writing operations, respectively. As in burst mode, the content of the Multibyte Selection Register (MSR) is ignored during external mode operation. The programmer need not, therefore, modify its setting when switching between external mode and normal multiplex mode.

In FIG. 6 A1 and A2 together represent the 16-bit input register driven by Bus-In. In single-byte mode, successive bytes are loaded only into byte register A2. Second-rank buffers A3 and A4 provide full overlapped byte disassembly facilities for subsequent transfer of the data word to the XSS or to the Internal Bus. The output buffers are organized in a similar manner with B1 and B2 driving Bus-Out.

The role of each of the functions illustrated in FIG. 6 will be described subsequently with the flow charts of FIGS. 7, 8 and 9. This material and the associated diagrams were prepared primarily to define and to illustrate the architectural features of external mode operation. While actual hardware implementation may differ physically, the functional and operational organization will be as described.

The operation of the SCU in External Mode will now be described for the case of transmission from XCH–A to XCH–B, as illustrated in FIG. 6. A READ EXTERNAL command is assumed to be loaded in the command register of XCH–A, while XCH–B correspondingly contains a WRITE EXTERNAL command.

The initial treatment of external mode ($E$=1) READ or WRITE commands has been described and the highlights of this initial selection are further illustrated in the instruction flow chart shown in FIG. 7. Once a READ, WRITE, or READ BACKWARD command is detected, the XCH immediately checks for the presence of the external mode selection bit (E-bit). If $E$=1, the XCH then checks the command register of the other XCH of the SCU for the presence of a waiting non-compatible external mode command. The following combinations are not allowed and result in an immediate command reject during initial selection of the second command loaded:

| XCH in Initial Selection | Other XCH, Already Loaded |
|---|---|
| Read External | Read Backward External and Run Latch On. |
| Do. | Read External and Run Latch On. |
| Write External | Write External and Run Latch On. |
| Read Backward External | Read External and Run Latch On. |
| Do. | Read Backward External and Run Latch On. |

The Run Latches are shown in FIG. 6. If the opposite Run Latch is not in the On condition, the command will not be rejected since this indicates that the otherwise illegal command is not waiting but rather in the process of termination. Such a situation could commonly arise during chaining of external mode commands.

If no exception conditions are detected, the XCH sets Channel End status and disconnects from the channel. The Run Latch is then set to unity, and the XCH waits for the rise of gating line G1 to initiate subsequent operation. This will occur immediately if the other XCH is already waiting.

It is important to note that the external mode commands are executed as immediate commands insofar as the system channel is concerned. Because of this feature, the single subchannel of a selector channel may be used to sequentially load each command register of the SCU (by means of two START I/O instructions). Once loaded, the subchannel and the I/O interface are available for other activity while the SCU operate concurrently and independently in external mode. By this means a single selector channel can effectively sustain concurrent, multiple I/O activity. Whether attached to a selector channel or multiplexor channel, operation of external mode commands does not tie up the channel beyond initial selection. Channel facilities are later required, however, for the transmission of ending status from each XCH.

When both external mode commands have been loaded into their respective transmission channels, the coincident output of the Run Latches raises the gating line G1 (see FIG. 6), and operation begins at once. FIGS. 7 and 8 describe in detail the sequence of events which follow. As mentioned earlier, it has been assumed that XCH–A operates with the transmitting device (READ EXTERNAL command) while XCH–B operates with the receiver (WRITE EXTERNAL command).

Each transmission channel immediately requests data: XCH–A raises its PDI tag-Out line/s to the transmitting device while XCH–B raises its Byte Request line to the CCS. As the bytes become available in XCH–A, they are placed on the internal bus, and the Byte Ready line is raised for each byte. The concurrence of the Byte Request and Byte Ready signals allows the Byte Delivered line to rise at XCH–B. XCH–B then moves each byte as it is received to the proper output buffer register. Unless XCH–B is operating in double-byte mode ($D_B$=a), the Byte Request Line is not lowered until each byte is accepted by the receiving device. The fall of the Byte Request line, which drives the Byte Accepted line of XCH–A via an inverter and one-shot (see FIG. 6) then notifies XCH–A that it may proceed.

When XCH–B is operating in double-byte mode, an additional internal data cycle is taken. XCH–B drops Byte Request as soon as the first (high-order) byte has been moved to the output buffer. When this drop is acknowledged by the fall of the Byte Ready line driven by XCH–A, XCH–B immediately raises Byte Request for the second (low-order) byte. When XCH–A is also operating in single-byte mode under these circumstances, XCH–A takes an additional PDI cycle to obtain the second byte for XCH–B. This second PDI cycle occurs concurrently with the transfer of the first data byte over the internal bus. The following table summarizes the possible alternatives for a single device-to-device cycle:

POSSIBLE ALTERNATIVES FOR A SINGLE DEVICE-TO-DEVICE CYCLE

| | Command Bit 2 | | Number of PDI cycles (XCH-A) | Number of internal SCU cycles | Number of PDI cycles (XCH-B) |
|---|---|---|---|---|---|
| | $D_A$ | $D_B$ | | | |
| Case: | | | | | |
| 1 | 0 | 0 | 1 | 1 | 1 |
| 2 | 0 | 1 | 2 | 2 | 1 |
| 3 | 1 | 0 | 1 | 2 | 2 |
| 4 | 1 | 1 | 1 | 2 | 1 |

It is important to note that with the exception of Case 2, the transmitting device is not again strobed (by the rise of the tag-out line/s of XCH-A) until the receiving device has fully accepted the previous word. In order to accommodate Case 2, the XCH channel containing the READ EXTERNAL command (XCH-A in the present example) must, of course, monitor the setting of the D-bit of the other channel. This will allow an additional PDI cycle to obtain the second byte for subsequent assembly in the buffer registers of XCH-B (FIG. 8). A full device-to-device cycle, therefore, requires that XCH-A receive the proper number of Byte Accepted pulses in order to proceed.

A basic design objective of the logic illustrated in FIGS. 6, 7 and 8 is provide assurance that either device may end the operation without residual data remaining in either XCH of the SCU. Such a termination is called a "Normal EOT".

The basic requirement for a Normal EOT is merely that the appropriate stop signals occur within the time intervals

ⓐ> ———— ⓐ>

(in Fig. 8) or

ⓑ> ———— ⓑ>

(in FIG. 9). A stop request at any other time will result in an uncertain ending condition.

A Normal EOT is thus assured under either of the following circumstances:

a. The transmitting device terminates the operation in response to the rise of the tag-Out line/s with EOR-In, EOF-In, and/or Attention-In.

b. The receiving device terminates the operation in response to the rise of the tag-Out line/s with EOR-In, EOF-In, and/or Attention-In and Proceed-In.

Under either of these circumstances no residual data will remain in the transmission path. Since these terminating sequences also satisfy the requirements for a Normal Device Stop (FIG. 7), the absence of a Termination Exception is assured. Terminating status will include Device End together with any other relevant status bits.

Whenever external mode operation is terminated by HALT I/O at either XCH, the ending condition is always uncertain. This follows from the fact that the presence of residual data cannot be detected in the transmitting XCH (i.e., the one executing the READ EXTERNAL command). The presence of residual data in the receiving XCH is, however, always defined by a Termination Exception. In any case, the reselected XCH will include Device End and Channel End in the ending status. Any absence of Unit Check from the transmitting XCH does not, however, preclude the presence of residual data.

Once device-to-device transmission has been terminated, each XCH returns to normal mode operation for separate presentation of its Unit Status byte to the system. The basic ending situations are discussed further in the paragraphs which follow.

The transmitter may end the sequence by raising either EOR-In, EOF-In, or Attention-In, in the usual manner. Skip-In may also be used as a modifier. A Normal EOT will occur if this is done in response to the rise of the tag-Out line/s at time ① in FIG. 8. XCH-A will then raise the Stop B line, and this signal will also terminate the functions of the CCS by resetting the Run Latches and dropping gating line G1. (FIG. 6)

The appearance of the resulting Halt signal at XCH-B will occur at time ② in FIG. 9 and since this is effectively within the interval

ⓑ> ———— ⓑ> a Normal EOT is accomplished. The Halt B signal also causes XCH-B to issue a Stop A signal; however, this redundant signal is blocked by the absence of G1. Termination at the PDI of XCH-B is then carried out in the usual manner.

The receiver may end the sequence by raising either EOR-In, EOF-In, or Attention-In, as in normal mode operation. Skip-In may also be used as a modifier. A Normal EOT will occur if these lines are raised concurrently with Proceed-In at time ③ in FIG. 9. This notifies XCH-B that the last data word on Bus-Out has been accepted, but that the receiving device will not accept further data. XCH-B then raises the Stop A line, and this signal will also terminate the functions of the CCS by resetting the Run Latches which drop gating line G1.

The appearance of the resulting Halt A signal at XCH-A will occur at time 4 in FIG. 8 and no residual data will remain in the transmission path. The Halt A signal also causes XCH-A to issue a Stop B signal; however, this redundant signal is blocked by the absence of G1. Termination at the PDI of XCH-A is then carried out in the usual manner.

The System/360 channel may end external mode operation at any time by reselecting either XCH and signalling Interface Disconnect. The SCU raises the Channel Stop line which in turn delivers the Halt signal to the affected XCH. The XCH immediately terminates operation and issues the Stop signal to the other XCH. This Stop signal resets the Run Latches which drops gating line G1, thus ending external mode operation. Termination at the PDI of each XCH proceeds as with normal read/write commands when interrupted by an interface disconnect signal.

The logic illustrated in FIG. 6 allows a single HALT I/O instruction, directed to either XCH, to terminate device-to-device communication. It should be noted that the XCH receiving the Halt signal cannot distinguish between a Channel Stop and a stop initiated by the other XCH. Termination at the XCH for these two situations is thus identical.

Since the execution of HALT I/O is completely asynchronous to external mode operation of the SCU, termination of device-to-device operation in this manner always leads to an uncertain ending condition. For those rare cases in which a Normal EOT does occur, however, it cannot be uniquely identified via the ending status messages alone. If residual data remains in the receiving XCH (the one executing a WRITE EXTERNAL command), the ending status will always include a Unit Check associated with the Termination Exception. Residual data in the transmitting XCH in not, however, indicated in terminating status. It may, however, be identified and extracted by means of the READ RESIDUAL command directed to the transmitting XCH. The treatment of Case 2 above will depend upon the specific design of the internal transmission sequence, and will be described at a later stage of the design of the SCU.

Device-to-Device data rates will ordinarily be limited only by the attached devices themselves.

While the data buffers of both XCH's of the SCU are used in external mode operation, the data path is nevertheless effectively unbuffered. This is a consequence of the design feature which prevents the tag-Out line/s from rising at the transmitting device until the associated XCH has been notified of the complete acceptance of the previous data word by the receiving device. Operation of paired synchronous devices (such as magnetic tape-to-tape is, nevertheless, possible with suitable provision for timing signals at each device adapter, provided that the data rates do not exceed the internal capacity of the SCU.

In many cases the external device may require cognizance of the fact that it is participating in the direct device-to-device data transfer. This could be indicated by bringing out gating line G1 to each PDI. However, because of the many other facilities of the PDI, this feature is not necessary. Instead, the systems designer may use the selectable C-Select and/or tag-out lines to notify the device of this condition. If command chaining is not involved, the lines of the Device Address Register (DAR) may also be used for this purpose.

The preceding description of the operation of the SCU during external mode completes the functional description of the present control unit. As stated previously, the actual timing controls within the Transmission Switching (XSS) and the Common Control Section (CCS) have not been specifically disclosed since these actual circuit design details would be readily apparent to one skilled in the art. Also, as stated previously, the timing details, etc. are dependent upon the structure of both the channel and the I/O interface to which the present control unit is connected.

For purposes of generally illustrating the comparative timing utilized within the present SCU, FIGS. 10, 11 and 12 are presented. These FIGS. show typical signal sequences on the I/O Interface and the Parallel Data Interface (PDI) during initial selection, burst-mode read operation, and burst-mode write operation. The figures and the timing diagrams indicate general signal sequences only and are not presumed to be representative of the exact timing. It will be noted that FIG. 10 actually shows the selection the particular unit and FIGS. 11 and 12 represent actual data transfer signals. The small arrows on all three figures are inserted for convenience to define the sequential occurrences within the unit.

CONCLUSIONS

The above description of the hardware comprising the present control unit, together with the detailed description of its functional operation under various operating conditions, clearly illustrates the versatile nature of this general-purpose channel control unit. It greatly expands the command structure for the basic system interface by providing a plurality of program selectable control lines and interrupt lines which may be suitably utilized by systems designers to achieve a wide range of functions with attached external or peripheral devices. The system further allows for programmer or peripheral device resetting of the Address Assignment Register thus allowing a more efficient use of the control unit itself Finally, the Special Control Unit allows a selective direct connection of two peripheral devices through their respective PDI's without the use of any portion of the central system or memory, except for initiation and termination of the data transfer. This latter feature, as described in preceding paragraphs, is provided by the External Mode operational capability of the SCU.

As stated previously in the specification, the list of channel commands utilizing the illustrated command format is provided by the system programmer. In order to successfully utilize the capabilities of the present system, it is necessary for the programmer to thoroughly understand the operational characteristics and the programming requirements of the SCU and the system to which it is attached.

Although no parity generating and testing circuits or other diagnostic or metering controls have been shown or described, they will, of course, be necessary in the implementation of any actual system component. However, this type of circuitry will be completely conventional in the present system environment.

As stated previously, the specific design of timing control circuitry, as well as the circuit specifications, are primarily dependent upon the particular system, channel, and actual interface utilized. Reference is made to the following IBM System/360 manuals of the Systems Reference Library available publicly in many libraries and also through International Business Machines Corporation, Data Processing Division, 112 East Post Road, White Plains, New York, 10601.

Specifically, the following manuals contain the necessary information which would allow a skilled systems engineer to construct and connect the Special Control Unit, set forth in the present application, to System/360 via the standard System/360 I/O interface of selector of multiplexor channels.

1. IBM System/360 Principles of Operation Form A22–682 1.
2. IBM System/360 I/O Interface Channel to Control Unit—OEMI, Form A22–6843.
3. IBM System/360 Bibliography Form A22–6822.

The above listed manuals provide adequate background information in the nature of timing and signal sequences, electrical characteristics, etc. for connection to System/360. The following publications describe the present device in far greater detail relative to actual System/360 design than is possible in the present application.

1. 2903 Special Control Unit —Form L22–6921–0.
2. "Functional Description of the Special Control Unit (SCU) for System/360"—IBM New yOrk Scientific Center Technical Report No. 320–2936, Mar., 1968.

While the above manuals provide the necessary information for building and operating the present control unit in an IBM System/360 environment, it is, of course, to be understood that the general principles of the invention are clearly and completely set forth herein so that a person skilled in the art may utilize the information to readily construct a control unit of this type for use with the product line of any computer manufacturer.

While the invention has been particularly shown and described with reference to a preferred embodiment thereof, it will be understood by those skilled in the art that various changes in form and details may be made therein without departing from the spirit and scope of the invention.

I claim:

1. In a computing system including a central processing unit, a memory shared by the I/O channels and the central processing unit, and instruction unit for providing commands to said computing system, said channels providing an interface for connecting external equipment to the computing system including peripheral devices to be used for system I/O purposes, said interface including common bus lines for transmitting commands and data to such equipment connected to said interface, the improvement which comprises a special control unit connected to said interface including:
- means for receiving data and command messages from said central processing unit,
- means for recognizing that a received message on the interface is directed to a specified peripheral device via said special control unit;
- means for decoding commands from said central processing unit for specified peripheral devices connected to said special control unit,
- means for transmitting said commands to a specified peripheral device and for setting up data paths between said peripheral device and the central processor unit; and
- means for signalling to the central processor that a requested task has been completed by the peripheral device.

2. A computing system including a special control unit as set forth in claim 1 wherein:
- commands from the central processing unit may have several command word formats; and
- means responsive to certain bits in the command words for changing the control function of other bits in the command word whereby an increased number of control commands may be given to the peripheral devices.

3. A computing system including a special control unit as set forth in claim 2 including common bus lines connected between said SCU and the system interface means in said special control unit for receiving both data and commands over said common bus lines and register means for recognizing and separately storing said data and commands.

4. A computing system including a special control unit as set forth in claim 3 including means for transmitting commands for execution to the intended peripheral devices.

5. A computing system including a special control unit as set forth in claim 1 including:

means in the special control unit responsive to a command from the central processing unit for changing the characteristic address of a peripheral device attached to said special control unit, said means including an address holding register within said special control unit for storing an address characteristic of both the peripheral device and said control unit.

6. A computing system including a special control unit as set forth in claim 5 wherein means are included in said peripheral device cooperative with control means within said special control unit for changing the contents of said address holding register within said special control unit.

7. A computing system including a special control unit as set forth in claim 6 including control means associated with said special control unit for allowing the setting of the contents of said address storing register directly by the system operator.

8. A computing system including a special control unit as set forth in claim 5 including at least two separate transmission channel means associated with each special control unit to each of which a plurality of different peripheral devices may be attached and means for selectively addressing any of said devices attached to each transmission channel over bus lines connected between each transmission channel and its associated peripheral devices.

9. A computing system including a special control unit as set forth in claim 8 including means for making a direct connection between a device attached to one of said transmission channels and a different device attached to another transmission channel, and means for disconnecting the special control unit from the system interface while the operation requiring said direct connection is being performed.

10. A computing system including a special control unit as set forth in claim 9 wherein at least two said special control units may be attached to the system interface, each said special control unit including:

means for recognizing its own specific address and for responding accordingly; and means for connecting a peripheral device connected to one said special control unit to a peripheral device connected to a different special control unit.

11. A computing system including a special control unit as set forth in claim 9 wherein each transmission channel within a special control unit normally has a fixed number of data transmission lines assigned thereto for communication with the system I/O interface, means within said special control unit for borrowing a predetermined portion of the data lines normally assigned to another transmission channel by a first transmission channel when it is desired to transmit expanded data over the system I/O interface to the central computing system.

12. In a computing system including a central processing unit, I/O channels providing an interface for connecting external equipment including peripheral devices used for performing system I/O functions to the computing system, said interface including means for transmitting commands and data to external equipment connected to said interface over common bus lines which may be shared with various external equipment units, a memory shared by the I/O channels and the central processing unit, and an instruction unit, the improvement which comprises a special control unit connected to said interface including:

means including register means for receiving data and command messages from said central processing unit;

means connected to said receiving means for recognizing that a received message on the interface is directed to said special control unit;

means connected to said register means for decoding command words from said central processing unit for specified peripheral devices connected to said control unit;

logic circuit means for changing the control function of various bits in the command word whereby an increased number of control commands may be given to the peripheral devices;

means in said special control unit for receiving both data and commands over said common bus lines including means for recognizing and separately storing said data and commands;

means for transmitting commands to the intended peripheral device from said storing means for execution;

means for setting up data paths between a specified peripheral device and the central processing unit; and means for signalling to the central processing unit that a requested task has been completed by the peripheral device.

13. A computing system including a special control unit as set forth in claim 12 including:

at least two separate transmission channel means associated with each special control unit to each of which a plurality of different peripheral devices may be attached;

means for selectively addressing any of said devices attached to such transmission channel;

means for directly connecting a device attached to one of said transmission channels; to a different device attached to another transmission channel; and means for disconnection the special control unit from the system interface while the operation requiring said connection is being performed.